US008323091B2

(12) United States Patent
Frank et al.

(10) Patent No.: US 8,323,091 B2
(45) Date of Patent: Dec. 4, 2012

(54) GAMING SYSTEM, GAMING DEVICE, AND METHOD FOR PROVIDING A CASCADING SYMBOL GAME INCLUDING SHIFTING DIFFERENT DETERMINED SYMBOLS

(75) Inventors: Gregory F. Frank, Tiburon, CA (US); Rogelio S. DeCasa, Reno, NV (US)

(73) Assignee: IGT, Reno, NV (US)

( * ) Notice: Subject to any disclaimer, the term of this patent is extended or adjusted under 35 U.S.C. 154(b) by 150 days.

(21) Appl. No.: 12/853,050

(22) Filed: Aug. 9, 2010

(65) Prior Publication Data

US 2012/0034973 A1 Feb. 9, 2012

(51) Int. Cl.
*A63F 13/00* (2006.01)

(52) U.S. Cl. .............................. 463/20; 463/16; 463/25

(58) Field of Classification Search .................... 463/16, 463/20, 25
See application file for complete search history.

(56) References Cited

U.S. PATENT DOCUMENTS

| | | | |
|---|---|---|---|
| 1,564,746 | A | 12/1925 | Barnard |
| 1,978,395 | A | 10/1934 | Groetchen |
| 3,420,525 | A | 1/1969 | Waders |
| 3,642,287 | A | 2/1972 | Lally et al. |
| 3,735,987 | A | 5/1973 | Ohki |
| 3,977,681 | A | 8/1976 | Deitrich |
| 4,099,722 | A | 7/1978 | Rodesch et al. |
| 4,114,890 | A | 9/1978 | Yamamoto et al. |
| 4,171,814 | A | 10/1979 | Tamano |
| 4,198,052 | A | 4/1980 | Gauselmann |
| 4,200,291 | A | 4/1980 | Hooker |
| 4,326,351 | A | 4/1982 | Heywood et al. |
| 4,357,567 | A | 11/1982 | Rock |
| 4,448,419 | A | 5/1984 | Telnaes |
| 4,573,681 | A | 3/1986 | Okada |
| 4,636,951 | A | 1/1987 | Harlick |
| 4,651,996 | A | 3/1987 | Watkins et al. |
| 4,695,053 | A | 9/1987 | Vazquez, Jr. et al. |
| 4,790,537 | A | 12/1988 | Smyth et al. |

(Continued)

FOREIGN PATENT DOCUMENTS

AU 710015 9/1997

(Continued)

OTHER PUBLICATIONS

All That Glitters website, written by WMS Gaming, published on or before Nov. 2007.

(Continued)

*Primary Examiner* — Peter DungBa Vo
*Assistant Examiner* — Damon Pierce
(74) *Attorney, Agent, or Firm* — Neal, Gerber & Eisenberg LLP

(57) ABSTRACT

During a play of a game, the disclosed gaming system determines that an ending condition has occurred. For example, the gaming system determines that an ending condition has occurred when no winning symbol combinations are displayed for the play of the game. Following determination that the ending condition has occurred, the gaming system determines whether to provide access to an additional win opportunity for the play of the game. If the additional win opportunity is to be provided, the gaming system removes one or more symbols from a plurality of symbol positions even though such symbols do not form a winning symbol combination. The gaming system fills any resulting empty symbol positions by shifting symbols and/or displaying generated symbols, and provides awards for any then-generated winning symbol combinations. The additional win opportunity may be accessed because of a player wager or because other additional win opportunity criteria are satisfied.

31 Claims, 13 Drawing Sheets

U.S. PATENT DOCUMENTS

| | | | |
|---|---|---|---|
| 4,826,169 | A | 5/1989 | Bessho et al. |
| 4,838,552 | A | 6/1989 | Hagiwara |
| 4,874,173 | A | 10/1989 | Kishishita |
| 5,019,973 | A | 5/1991 | Wilcox et al. |
| 5,152,529 | A | 10/1992 | Okada |
| 5,205,555 | A | 4/1993 | Hamano |
| RE34,244 | E | 5/1993 | Hagiwara |
| 5,308,065 | A | 5/1994 | Bridgeman et al. |
| 5,332,228 | A | 7/1994 | Schultz |
| 5,364,100 | A | 11/1994 | Ludlow et al. |
| 5,393,061 | A | 2/1995 | Manship et al. |
| 5,395,111 | A | 3/1995 | Inoue |
| 5,423,539 | A | 6/1995 | Nagao |
| 5,431,408 | A | 7/1995 | Adams |
| 5,449,173 | A | 9/1995 | Thomas et al. |
| 5,564,700 | A | 10/1996 | Celona |
| 5,580,053 | A | 12/1996 | Crouch |
| 5,584,764 | A | 12/1996 | Inoue |
| 5,609,524 | A | 3/1997 | Inoue |
| 5,611,535 | A | 3/1997 | Tiberio |
| 5,624,119 | A | 4/1997 | Leake |
| 5,664,998 | A | 9/1997 | Seelig et al. |
| 5,704,835 | A | 1/1998 | Dietz |
| 5,720,662 | A | 2/1998 | Holmes et al. |
| 5,722,891 | A | 3/1998 | Inoue |
| 5,752,881 | A | 5/1998 | Inoue |
| 5,766,074 | A | 6/1998 | Cannon et al. |
| 5,769,716 | A | 6/1998 | Saffari et al. |
| 5,772,506 | A | 6/1998 | Marks et al. |
| 5,807,172 | A | 9/1998 | Piechowiak |
| 5,813,911 | A | 9/1998 | Margolin |
| 5,823,873 | A | 10/1998 | Moody |
| 5,833,238 | A | 11/1998 | Watanabe |
| 5,833,536 | A | 11/1998 | Davids et al. |
| 5,833,537 | A | 11/1998 | Barrie |
| 5,863,249 | A | 1/1999 | Inoue |
| 5,882,260 | A | 3/1999 | Marks et al. |
| 5,927,714 | A | 7/1999 | Kaplan |
| 5,935,002 | A | 8/1999 | Falciglia |
| 5,951,397 | A | 9/1999 | Dickinson |
| 5,980,384 | A | 11/1999 | Barrie |
| 5,984,782 | A | 11/1999 | Innoue |
| 5,997,400 | A | 12/1999 | Seelig et al. |
| 5,997,401 | A | 12/1999 | Crawford |
| 6,027,115 | A | 2/2000 | Griswold et al. |
| 6,033,307 | A | 3/2000 | Vancura |
| 6,056,642 | A | 5/2000 | Bennett |
| 6,059,289 | A | 5/2000 | Vancura |
| 6,059,658 | A | 5/2000 | Mangano et al. |
| 6,086,066 | A | 7/2000 | Tekeuchi et al. |
| 6,089,976 | A | 7/2000 | Schneider et al. |
| 6,089,977 | A | 7/2000 | Bennett |
| 6,093,102 | A | 7/2000 | Bennett |
| 6,095,921 | A | 8/2000 | Walker et al. |
| 6,117,013 | A | 9/2000 | Eiba |
| 6,120,031 | A | 9/2000 | Adams |
| 6,120,376 | A | 9/2000 | Cherry |
| 6,120,377 | A | 9/2000 | McGinnis et al. |
| 6,142,875 | A | 11/2000 | Kodachi et al. |
| 6,149,521 | A | 11/2000 | Sanduski |
| 6,159,095 | A | 12/2000 | Frohm et al. |
| 6,159,096 | A | 12/2000 | Yoseloff |
| 6,174,235 | B1 | 1/2001 | Walker et al. |
| 6,190,254 | B1 | 2/2001 | Bennett |
| 6,203,009 | B1 | 3/2001 | Sines et al. |
| 6,220,959 | B1 | 4/2001 | Holmes, Jr. et al. |
| 6,224,484 | B1 | 5/2001 | Okuda et al. |
| 6,227,971 | B1 | 5/2001 | Weiss |
| 6,241,607 | B1 | 6/2001 | Payne et al. |
| 6,251,013 | B1 | 6/2001 | Bennett |
| 6,254,481 | B1 | 7/2001 | Jaffe |
| 6,261,178 | B1 | 7/2001 | Bennett |
| 6,270,411 | B1 | 8/2001 | Gura et al. |
| 6,270,412 | B1 | 8/2001 | Crawford et al. |
| 6,290,600 | B1 | 9/2001 | Glasson |
| 6,299,165 | B1 | 10/2001 | Nagano |
| 6,299,170 | B1 | 10/2001 | Yoseloff |
| 6,302,398 | B1 | 10/2001 | Vecchio |
| 6,302,429 | B1 | 10/2001 | Friedrich |
| 6,305,686 | B1 | 10/2001 | Perrie et al. |
| 6,309,300 | B1 | 10/2001 | Glavich |
| 6,311,976 | B1 | 11/2001 | Yoseloff et al. |
| 6,315,660 | B1 | 11/2001 | DeMar et al. |
| 6,315,663 | B1 | 11/2001 | Sakamoto |
| 6,315,664 | B1 | 11/2001 | Baerlocher et al. |
| 6,318,721 | B1 | 11/2001 | Randall et al. |
| 6,319,124 | B1 | 11/2001 | Baerlocher et al. |
| 6,322,078 | B1 | 11/2001 | Adams |
| 6,347,996 | B1 | 2/2002 | Gilmore et al. |
| 6,358,144 | B1 | 3/2002 | Kaddlic et al. |
| 6,364,766 | B1 | 4/2002 | Anderson et al. |
| 6,364,767 | B1 | 4/2002 | Brossard et al. |
| 6,375,570 | B1 | 4/2002 | Poole |
| 6,394,902 | B1 | 5/2002 | Glavich et al. |
| 6,398,644 | B1 | 6/2002 | Perrie et al. |
| 6,409,172 | B1 | 6/2002 | Vancura |
| 6,409,602 | B1 | 6/2002 | Wilshire et al. |
| 6,413,161 | B1 | 7/2002 | Baerlocher et al. |
| 6,413,162 | B1 | 7/2002 | Baerlocher et al. |
| 6,416,408 | B2 | 7/2002 | Tracy et al. |
| 6,419,579 | B1 | 7/2002 | Bennett |
| 6,428,412 | B1 | 8/2002 | Anderson et al. |
| 6,439,993 | B1 | 8/2002 | O'Halloran |
| 6,439,995 | B1 | 8/2002 | Hughs-Baird et al. |
| 6,443,452 | B1 | 9/2002 | Brune |
| 6,450,883 | B1 | 9/2002 | O'Halloran |
| 6,454,266 | B1 | 9/2002 | Breeding et al. |
| 6,464,581 | B1 | 10/2002 | Yoseloff et al. |
| 6,481,713 | B2 | 11/2002 | Perrie et al. |
| 6,494,454 | B2 | 12/2002 | Adams |
| 6,506,114 | B1 | 1/2003 | Estes et al. |
| 6,511,375 | B1 | 1/2003 | Kaminkow |
| 6,514,141 | B1 | 2/2003 | Kaminkow et al. |
| 6,517,432 | B1 | 2/2003 | Jaffe |
| 6,517,433 | B2 | 2/2003 | Loose et al. |
| 6,551,187 | B1 | 4/2003 | Jaffe |
| 6,558,254 | B2 | 5/2003 | Baerlocher et al. |
| 6,561,899 | B2 | 5/2003 | Vancura |
| 6,561,900 | B1 | 5/2003 | Baerlocher et al. |
| 6,561,904 | B2 | 5/2003 | Locke et al. |
| 6,565,433 | B1 | 5/2003 | Baerlocher et al. |
| 6,575,830 | B2 | 6/2003 | Baerlocher et al. |
| 6,582,307 | B2 | 6/2003 | Webb |
| 6,585,591 | B1 | 7/2003 | Baerlocher et al. |
| 6,589,114 | B2 | 7/2003 | Rose |
| 6,599,185 | B1 | 7/2003 | Kaminkow et al. |
| 6,602,136 | B1 | 8/2003 | Baerlocher et al. |
| 6,602,137 | B2 | 8/2003 | Kaminkow et al. |
| 6,604,740 | B1 | 8/2003 | Singer et al. |
| 6,609,971 | B2 | 8/2003 | Vancura |
| 6,616,142 | B2 | 9/2003 | Adams |
| 6,632,139 | B1 | 10/2003 | Baerlocher |
| 6,632,140 | B2 | 10/2003 | Berman et al. |
| 6,634,943 | B1 | 10/2003 | Baerlocher |
| 6,634,945 | B2 | 10/2003 | Glavich et al. |
| 6,641,477 | B1 | 11/2003 | Dietz |
| 6,643,943 | B2 | 11/2003 | Dall'Aglio et al. |
| 6,644,663 | B2 | 11/2003 | Seelig et al. |
| 6,659,864 | B2 | 12/2003 | McGahn et al. |
| 6,666,767 | B1 | 12/2003 | Dayan |
| 6,669,559 | B1 | 12/2003 | Baerlocher et al. |
| 6,672,960 | B1 | 1/2004 | B-Jensen |
| 6,676,511 | B2 | 1/2004 | Payne et al. |
| 6,676,512 | B2 | 1/2004 | Fong et al. |
| 6,676,516 | B2 | 1/2004 | Baerlocher et al. |
| 6,695,696 | B1 | 2/2004 | Kaminkow |
| 6,702,671 | B2 | 3/2004 | Tarantino |
| 6,702,675 | B2 | 3/2004 | Poole et al. |
| 6,712,693 | B1 | 3/2004 | Hettinger |
| 6,719,630 | B1 | 4/2004 | Seelig et al. |
| 6,726,204 | B2 | 4/2004 | Inoue |
| 6,731,313 | B1 | 5/2004 | Kaminkow |
| 6,733,386 | B2 | 5/2004 | Cuddy et al. |
| 6,750,715 | B2 | 6/2004 | Allott et al. |
| 6,758,747 | B2 | 7/2004 | Baerlocher |
| 6,769,983 | B2 | 8/2004 | Slomiany |
| 6,780,107 | B2 | 8/2004 | Baerlocher et al. |

| | | | |
|---|---|---|---|
| 6,780,109 | B2 | 8/2004 | Kaminkow |
| 6,783,457 | B2 | 8/2004 | Hughs-Baird et al. |
| 6,786,820 | B2 | 9/2004 | Gerrard et al. |
| 6,802,775 | B2 | 10/2004 | Baerlocher et al. |
| 6,805,349 | B2 | 10/2004 | Baerlocher et al. |
| 6,808,454 | B2 | 10/2004 | Gerrard et al. |
| 6,817,944 | B2 | 11/2004 | Kaminkow et al. |
| 6,832,957 | B2 | 12/2004 | Falconer |
| 6,835,133 | B2 | 12/2004 | Baerlocher et al. |
| 6,837,788 | B2 | 1/2005 | Cannon |
| 6,852,028 | B2 | 2/2005 | Vancura |
| 6,855,054 | B2 | 2/2005 | White et al. |
| 6,866,583 | B2 | 3/2005 | Glavich et al. |
| 6,875,106 | B2 | 4/2005 | Weiss et al. |
| 6,875,108 | B1 | 4/2005 | Hughs-Baird |
| 6,880,826 | B2 | 4/2005 | Inoue |
| 6,896,615 | B2 | 5/2005 | Berman |
| 6,896,617 | B2 | 5/2005 | Daly |
| 6,899,620 | B2 | 5/2005 | Kaminkow et al. |
| 6,905,405 | B2 | 6/2005 | McClintic |
| 6,905,406 | B2 | 6/2005 | Kaminkow et al. |
| 6,908,383 | B2 | 6/2005 | Baerlocher et al. |
| 6,910,962 | B2 | 6/2005 | Marks et al. |
| 6,913,532 | B2 | 7/2005 | Baerlocher et al. |
| 6,913,533 | B2 | 7/2005 | Cuddy et al. |
| 6,918,832 | B2 | 7/2005 | Baerlocher et al. |
| 6,918,834 | B2 | 7/2005 | Vancura |
| 6,921,335 | B2 | 7/2005 | Rodgers et al. |
| 6,923,441 | B2 | 8/2005 | Inoue |
| 6,929,952 | B2 | 8/2005 | Baerlocher |
| 6,932,700 | B2 | 8/2005 | Bennett et al. |
| 6,932,701 | B2 | 8/2005 | Glavich et al. |
| 6,939,223 | B1 | 9/2005 | Jones |
| 6,942,571 | B1 | 9/2005 | McAllister et al. |
| 6,942,572 | B2 | 9/2005 | Inoue |
| 6,955,600 | B2 | 10/2005 | Glavich et al. |
| 6,958,013 | B2 | 10/2005 | Miereau et al. |
| 6,960,133 | B1 | 11/2005 | Marks et al. |
| 6,971,955 | B2 | 12/2005 | Baerlocher et al. |
| 6,976,915 | B2 | 12/2005 | Baker et al. |
| 6,979,263 | B2 | 12/2005 | Baerlocher et al. |
| 6,981,635 | B1 | 1/2006 | Hughs-Baird et al. |
| 6,986,710 | B2 | 1/2006 | Baerlocher et al. |
| 6,988,947 | B2 | 1/2006 | Baerlocher et al. |
| 6,991,538 | B2 | 1/2006 | Cannon |
| 6,997,804 | B2 | 2/2006 | Berman |
| 6,997,808 | B2 | 2/2006 | Rodgers et al. |
| 7,001,274 | B2 | 2/2006 | Baerlocher et al. |
| 7,014,559 | B1 | 3/2006 | Fong |
| 7,014,560 | B2 | 3/2006 | Glavich et al. |
| 7,018,293 | B2 | 3/2006 | Brown et al. |
| 7,037,191 | B2 | 5/2006 | Rodgers et al. |
| 7,040,984 | B2 | 5/2006 | Mead |
| 7,040,985 | B2 | 5/2006 | Vancura |
| 7,048,275 | B2 | 5/2006 | Adams |
| 7,052,395 | B2 | 5/2006 | Glavich et al. |
| 7,056,213 | B2 | 6/2006 | Ching et al. |
| 7,066,814 | B2 | 6/2006 | Glavich et al. |
| 7,070,502 | B1 | 7/2006 | Bussick et al. |
| 7,074,127 | B2 | 7/2006 | Cuddy et al. |
| 7,077,744 | B2 | 7/2006 | Cannon |
| 7,077,745 | B2 | 7/2006 | Gomez et al. |
| 7,090,580 | B2 | 8/2006 | Rodgers et al. |
| 7,094,148 | B2 | 8/2006 | Baerlocher et al. |
| 7,104,886 | B2 | 9/2006 | Baerlocher et al. |
| 7,104,888 | B2 | 9/2006 | Miereau et al. |
| 7,108,602 | B2 | 9/2006 | Daly |
| 7,112,137 | B2 | 9/2006 | Baerlocher et al. |
| 7,115,033 | B1 | 10/2006 | Timperley |
| 7,121,942 | B2 | 10/2006 | Baerlocher |
| 7,137,888 | B2 | 11/2006 | Glavich et al. |
| 7,144,322 | B2 | 12/2006 | Gomez et al. |
| 7,153,205 | B2 | 12/2006 | Baerlocher |
| 7,160,186 | B2 | 1/2007 | Cuddy et al. |
| 7,160,187 | B2 | 1/2007 | Loose et al. |
| 7,168,704 | B1 | 1/2007 | Lawless |
| 7,169,042 | B2 | 1/2007 | Muir et al. |
| 7,172,506 | B2 | 2/2007 | Baerlocher et al. |
| 7,192,345 | B2 | 3/2007 | Muir et al. |
| 7,195,559 | B2 | 3/2007 | Gilmore et al. |
| 7,204,753 | B2 | 4/2007 | Ozaki et al. |
| 7,226,359 | B2 | 6/2007 | Bussick et al. |
| 7,235,011 | B2 | 6/2007 | Randall et al. |
| 7,236,113 | B1 | 6/2007 | Wang |
| 7,247,096 | B2 | 7/2007 | Vancura |
| 7,252,591 | B2 | 8/2007 | Van Asdale |
| 7,252,592 | B2 | 8/2007 | Rodgers et al. |
| 7,258,611 | B2 | 8/2007 | Bigelow, Jr. et al. |
| 7,264,545 | B2 | 9/2007 | Maya et al. |
| 7,273,415 | B2 | 9/2007 | Cregan et al. |
| 7,275,988 | B2 | 10/2007 | Aida et al. |
| 7,291,068 | B2 | 11/2007 | Bryant et al. |
| 7,294,058 | B1 | 11/2007 | Slomiany et al. |
| 7,300,348 | B2 | 11/2007 | Kaminkow et al. |
| 7,309,281 | B2 | 12/2007 | Baerlocher et al. |
| 7,314,409 | B2 | 1/2008 | Maya et al. |
| 7,316,609 | B2 | 1/2008 | Dunn et al. |
| 7,318,773 | B2 | 1/2008 | Baerlocher et al. |
| 7,326,113 | B2 | 2/2008 | Bennett et al. |
| 7,331,862 | B2 | 2/2008 | Rodgers et al. |
| 7,331,866 | B2 | 2/2008 | Rodgers et al. |
| 7,335,102 | B2 | 2/2008 | Baerlocher et al. |
| 7,338,367 | B2 | 3/2008 | Kaminkow et al. |
| 7,357,713 | B2 | 4/2008 | Marks et al. |
| 7,371,168 | B2 | 5/2008 | Bilyeu et al. |
| 7,371,169 | B2 | 5/2008 | Baerlocher |
| 7,371,170 | B2 | 5/2008 | Cregan et al. |
| 7,371,174 | B2 | 5/2008 | Baerlocher |
| 7,377,849 | B2 | 5/2008 | Baerlocher et al. |
| 7,381,134 | B2 | 6/2008 | Cuddy et al. |
| 7,396,279 | B2 | 7/2008 | Berman et al. |
| 7,399,225 | B2 | 7/2008 | Kaminkow |
| 7,402,102 | B2 | 7/2008 | Marks et al. |
| 7,413,510 | B2 | 8/2008 | Schlegel et al. |
| 7,419,431 | B2 | 9/2008 | Gauselmann et al. |
| 7,442,123 | B2 | 10/2008 | Brill et al. |
| 7,473,174 | B2 | 1/2009 | Cuddy et al. |
| 7,503,848 | B2 | 3/2009 | Berman et al. |
| 7,513,826 | B2 | 4/2009 | Cuddy |
| 7,544,129 | B2 | 6/2009 | Baerlocher |
| 7,553,231 | B2 | 6/2009 | Rodgers et al. |
| 7,628,694 | B2 | 12/2009 | Timperley |
| 2001/0024970 | A1 | 9/2001 | McKee et al. |
| 2002/0010017 | A1 | 1/2002 | Bennett |
| 2002/0052232 | A1 | 5/2002 | Kaminkow |
| 2002/0052233 | A1 | 5/2002 | Gauselmann |
| 2002/0068623 | A1 | 6/2002 | Gauselmann |
| 2002/0077165 | A1 | 6/2002 | Bansemer et al. |
| 2002/0160836 | A1 | 10/2002 | Watanabe et al. |
| 2003/0013518 | A1 | 1/2003 | Graham |
| 2003/0045345 | A1 | 3/2003 | Bermin |
| 2003/0054874 | A1 | 3/2003 | Kaminkow |
| 2003/0057645 | A1 | 3/2003 | Baerlocher et al. |
| 2003/0060267 | A1 | 3/2003 | Glavich et al. |
| 2003/0092480 | A1 | 5/2003 | White et al. |
| 2003/0100356 | A1 | 5/2003 | Brown et al. |
| 2003/0125100 | A1 | 7/2003 | Cannon |
| 2003/0153382 | A1 | 8/2003 | Vancura |
| 2003/0157981 | A1 | 8/2003 | Marks et al. |
| 2003/0203752 | A1 | 10/2003 | Kaminkow et al. |
| 2003/0203753 | A1 | 10/2003 | Muir et al. |
| 2003/0207710 | A1 | 11/2003 | Rodgers et al. |
| 2004/0012145 | A1 | 1/2004 | Inoue |
| 2004/0014516 | A1 | 1/2004 | Inoue |
| 2004/0014517 | A1 | 1/2004 | Inoue |
| 2004/0018866 | A1 | 1/2004 | Inoue |
| 2004/0026854 | A1 | 2/2004 | Inoue |
| 2004/0033827 | A1 | 2/2004 | Gilmore et al. |
| 2004/0033829 | A1 | 2/2004 | Pacey et al. |
| 2004/0036218 | A1 | 2/2004 | Inoue |
| 2004/0038726 | A1 | 2/2004 | Inoue |
| 2004/0043809 | A1 | 3/2004 | Gomez et al. |
| 2004/0048649 | A1 | 3/2004 | Peterson et al. |
| 2004/0048650 | A1 | 3/2004 | Mierau et al. |
| 2004/0048651 | A1 | 3/2004 | Vorias et al. |
| 2004/0053665 | A1 | 3/2004 | Baerlocher |
| 2004/0053669 | A1 | 3/2004 | Gerrard et al. |
| 2004/0053672 | A1 | 3/2004 | Baerlocher |

| | | | |
|---|---|---|---|
| 2004/0053676 | A1 | 3/2004 | Rodgers |
| 2004/0053677 | A1 | 3/2004 | Hughs-Baird |
| 2004/0067790 | A1 | 4/2004 | Peterson et al. |
| 2004/0072612 | A1 | 4/2004 | Rodgers et al. |
| 2004/0082378 | A1 | 4/2004 | Peterson et al. |
| 2004/0092302 | A1 | 5/2004 | Gauselmann |
| 2004/0097280 | A1 | 5/2004 | Gauselmann |
| 2004/0102236 | A1 | 5/2004 | Suda et al. |
| 2004/0137981 | A1 | 7/2004 | Gauselmann et al. |
| 2004/0137982 | A1 | 7/2004 | Cuddy et al. |
| 2004/0147306 | A1 | 7/2004 | Randall et al. |
| 2004/0242313 | A1 | 12/2004 | Munoz |
| 2005/0020344 | A1 | 1/2005 | Kaminkow |
| 2005/0033461 | A1 | 2/2005 | Gerrard et al. |
| 2005/0049035 | A1 | 3/2005 | Baerlocher et al. |
| 2005/0054405 | A1 | 3/2005 | Baerlocher et al. |
| 2005/0054415 | A1 | 3/2005 | Kaminkow et al. |
| 2005/0054416 | A1 | 3/2005 | Hostetler et al. |
| 2005/0054418 | A1 | 3/2005 | Baerlocher |
| 2005/0054429 | A1 | 3/2005 | Baerlocher et al. |
| 2005/0054435 | A1 | 3/2005 | Rodgers et al. |
| 2005/0054436 | A1 | 3/2005 | Frizzell et al. |
| 2005/0059446 | A1 | 3/2005 | Kaminkow |
| 2005/0059456 | A1 | 3/2005 | Mead et al. |
| 2005/0059461 | A1 | 3/2005 | Ching et al. |
| 2005/0059474 | A1 | 3/2005 | O'Halloran |
| 2005/0059477 | A1 | 3/2005 | Baerlocher |
| 2005/0059478 | A1 | 3/2005 | Peterson et al. |
| 2005/0064924 | A1 | 3/2005 | Glavich et al. |
| 2005/0070354 | A1 | 3/2005 | Baerlocher et al. |
| 2005/0071023 | A1 | 3/2005 | Gilliland et al. |
| 2005/0096115 | A1 | 5/2005 | Vancura |
| 2005/0096121 | A1 | 5/2005 | Gilliland et al. |
| 2005/0096123 | A1 | 5/2005 | Cregan et al. |
| 2005/0101372 | A1 | 5/2005 | Mierau et al. |
| 2005/0101380 | A1 | 5/2005 | Glavich et al. |
| 2005/0119043 | A1 | 6/2005 | Berman et al. |
| 2005/0119403 | A1 | 6/2005 | St. Clair |
| 2005/0148381 | A1 | 7/2005 | Marks et al. |
| 2005/0148384 | A1 | 7/2005 | Marks et al. |
| 2005/0164774 | A1 | 7/2005 | Gauselmann |
| 2005/0187004 | A1 | 8/2005 | Vancura |
| 2005/0192081 | A1 | 9/2005 | Marks et al. |
| 2005/0208994 | A1 | 9/2005 | Berman |
| 2005/0227754 | A1 | 10/2005 | Kaminkow et al. |
| 2005/0282620 | A1 | 12/2005 | Marks et al. |
| 2005/0288094 | A1 | 12/2005 | Marks et al. |
| 2006/0019738 | A1 | 1/2006 | Baerlocher et al. |
| 2006/0025196 | A1 | 2/2006 | Webb et al. |
| 2006/0030387 | A1 | 2/2006 | Jackson |
| 2006/0030392 | A1 | 2/2006 | Rodgers et al. |
| 2006/0030401 | A1 | 2/2006 | Mead et al. |
| 2006/0040728 | A1 | 2/2006 | Fuller |
| 2006/0046830 | A1 | 3/2006 | Webb |
| 2006/0058095 | A1 | 3/2006 | Berman et al. |
| 2006/0058097 | A1 | 3/2006 | Berman et al. |
| 2006/0063584 | A1 | 3/2006 | Brill et al. |
| 2006/0063585 | A1 | 3/2006 | Cuddy |
| 2006/0068875 | A1 | 3/2006 | Cregan et al. |
| 2006/0068882 | A1 | 3/2006 | Baerlocher et al. |
| 2006/0068883 | A1 | 3/2006 | Randall et al. |
| 2006/0068884 | A1 | 3/2006 | Baerlocher et al. |
| 2006/0068885 | A1 | 3/2006 | Cregan et al. |
| 2006/0073872 | A1 | 4/2006 | B-jensen et al. |
| 2006/0073874 | A1 | 4/2006 | Cregan et al. |
| 2006/0073876 | A1 | 4/2006 | Cuddy |
| 2006/0073879 | A1 | 4/2006 | Baerlocher |
| 2006/0084492 | A1 | 4/2006 | Baerlocher et al. |
| 2006/0084493 | A1 | 4/2006 | Pederson et al. |
| 2006/0084494 | A1 | 4/2006 | Belger et al. |
| 2006/0084498 | A1 | 4/2006 | Baerlocher et al. |
| 2006/0084500 | A1 | 4/2006 | Baerlocher et al. |
| 2006/0089191 | A1 | 4/2006 | Singer et al. |
| 2006/0111174 | A1 | 5/2006 | Baerlocher et al. |
| 2006/0116195 | A1 | 6/2006 | Baerlocher et al. |
| 2006/0135247 | A1 | 6/2006 | Baerlocher et al. |
| 2006/0172795 | A1 | 8/2006 | Bussick et al. |
| 2006/0199636 | A1 | 9/2006 | Ching et al. |
| 2006/0199637 | A1 | 9/2006 | Ching et al. |
| 2006/0217189 | A1 | 9/2006 | Walker et al. |
| 2006/0246977 | A1 | 11/2006 | Cannon |
| 2006/0264254 | A1 | 11/2006 | Aoki |
| 2007/0004489 | A1 | 1/2007 | Rodgers et al. |
| 2007/0010316 | A1 | 1/2007 | Baerlocher et al. |
| 2007/0015566 | A1 | 1/2007 | Baerlocher et al. |
| 2007/0021175 | A1 | 1/2007 | Rodgers et al. |
| 2007/0021187 | A1 | 1/2007 | Gauselmann |
| 2007/0021188 | A1 | 1/2007 | Rodgers et al. |
| 2007/0026923 | A1 | 2/2007 | Muir |
| 2007/0032285 | A1 | 2/2007 | Wolf |
| 2007/0060246 | A1 | 3/2007 | Baerlocher et al. |
| 2007/0060248 | A1 | 3/2007 | Rodgers et al. |
| 2007/0060255 | A1 | 3/2007 | Baerlocher et al. |
| 2007/0060271 | A1 | 3/2007 | Cregan et al. |
| 2007/0060294 | A1 | 3/2007 | Cuddy et al. |
| 2007/0087812 | A1 | 4/2007 | Glavich et al. |
| 2007/0232383 | A1 | 10/2007 | Berman |
| 2007/0287523 | A1 | 12/2007 | Esses et al. |
| 2008/0045322 | A1 | 2/2008 | Berman |
| 2008/0045323 | A1 | 2/2008 | Berman |
| 2008/0051174 | A1 | 2/2008 | Fiden |
| 2008/0064485 | A1 | 3/2008 | Tedsen et al. |
| 2008/0076532 | A1 | 3/2008 | Graham et al. |
| 2008/0090655 | A1 | 4/2008 | Marks et al. |
| 2008/0102931 | A1 | 5/2008 | Marks |
| 2008/0113735 | A1 | 5/2008 | Maya |
| 2008/0113761 | A1 | 5/2008 | Belger et al. |
| 2008/0113765 | A1 | 5/2008 | DeWaal |
| 2008/0132320 | A1 | 6/2008 | Rodgers |
| 2008/0139298 | A1 | 6/2008 | Rodgers |
| 2008/0146321 | A1 | 6/2008 | Parente |
| 2008/0161097 | A1 | 7/2008 | Baerlocher et al. |
| 2008/0176626 | A1 | 7/2008 | Okada |
| 2008/0176634 | A1 | 7/2008 | Berman et al. |
| 2008/0200232 | A1 | 8/2008 | Baerlocher et al. |
| 2008/0207305 | A1 | 8/2008 | Cregan et al. |
| 2008/0214272 | A1 | 9/2008 | Baerlocher et al. |
| 2008/0214283 | A1 | 9/2008 | Cregan et al. |
| 2008/0227541 | A1 | 9/2008 | Berman et al. |
| 2008/0287178 | A1 | 11/2008 | Berman et al. |
| 2008/0287179 | A1 | 11/2008 | Berman et al. |
| 2009/0104959 | A1 | 4/2009 | Caputo et al. |

FOREIGN PATENT DOCUMENTS

| | | |
|---|---|---|
| AU | 722969 | 6/1998 |
| AU | 199917318 | 9/1999 |
| AU | 755879 | 2/2001 |
| EP | 0058488 | 8/1982 |
| EP | 0060019 | 9/1982 |
| EP | 0874337 | 10/1998 |
| EP | 0981119 | 2/2000 |
| EP | 0984408 | 3/2000 |
| EP | 1063622 | 12/2000 |
| EP | 1184822 | 3/2002 |
| EP | 1205894 | 5/2002 |
| EP | 1422673 | 5/2004 |
| EP | 1513117 | 3/2005 |
| GB | 1454046 | 10/1976 |
| GB | 2062922 | 5/1981 |
| GB | 2106293 | 9/1981 |
| GB | 2081952 | 2/1982 |
| GB | 2090690 | 7/1982 |
| GB | 2096376 | 10/1982 |
| GB | 2097160 | 10/1982 |
| GB | 2100905 | 1/1983 |
| GB | 2105891 | 3/1983 |
| GB | 2106295 | 4/1983 |
| GB | 2113881 | 8/1983 |
| GB | 2117155 | 10/1983 |
| GB | 2137392 | 10/1984 |
| GB | 2161008 | 1/1986 |
| GB | 2165385 | 4/1986 |
| GB | 2170636 | 8/1986 |
| GB | 2180087 | 3/1987 |
| GB | 2181589 | 4/1987 |
| GB | 2183882 | 6/1987 |
| GB | 2191030 | 12/1987 |
| GB | 2222712 | 3/1990 |

| | | |
|---|---|---|
| GB | 2225889 | 6/1990 |
| GB | 2226436 | 6/1990 |
| GB | 2242300 | 9/1991 |
| GB | 2243236 | 10/1991 |
| GB | 2262642 | 6/1993 |
| GB | 2322217 | 8/1998 |
| GB | 2335524 | 9/1999 |
| GB | 2372132 | 2/2001 |
| GB | 2372617 | 8/2002 |
| GB | 2393555 | 3/2004 |
| WO | WO97/32285 | 9/1997 |
| WO | WO98/20949 | 5/1998 |
| WO | WO00/30727 | 6/2000 |
| WO | WO00/32286 | 6/2000 |
| WO | WO00/66235 | 11/2000 |
| WO | WO00/76606 | 12/2000 |
| WO | WO01/26019 | 4/2001 |
| WO | WO03/026759 | 4/2003 |
| WO | WO2004/025584 | 3/2004 |
| WO | WO2005/028043 | 3/2005 |
| WO | WO2006/076294 | 7/2006 |
| WO | WO2007/002935 | 1/2007 |
| WO | WO2007/053349 | 5/2007 |
| WO | WO2007/084766 | 7/2007 |
| WO | WO2007/130443 | 11/2007 |
| WO | WO2007/130444 | 11/2007 |

OTHER PUBLICATIONS

"Barn Yard by Aristocrat," article written by Strictly Slots, published Mar. 2002.

Bejeweled Web site, written by PopCap Games, http://www.popcap.com, published prior to Sep. 9, 2005.

Black Swan Paytable Display, written by IGT, published prior to 2001.

Break the Spell Advertisement written by Atronic Casino Technology, Ltd., published prior to Jan. 1, 2000.

Brokopp, John, "A Study in Slot Machine Research and Development," published at www.casinocitytimes.com on Nov. 30, 2005.

"Cash Chameleon," article written by Strictly Slots/Aristocrat Leisure Industries, PTY Ltd., published in Apr. 2001.

Catch a Wave Advertisement written by IGT, published in Dec. 2000.

Cossack Dancer Advertisement written by Olympic Video Gaming, published prior to 2002.

Double Diamond Line Advertisement written by Bally Gaming Systems, published in 2000.

Easy Street Advertisements and Articles, written by Casino Data Systems, published in 2000.

ENCHANTED FOREST™ Gaming Description from Aristocrat, available in 1994.

Enchanted Unicorn Advertisement written by IGT, published in 2001.

"Expanding Symbol," Description, written by IGT, published Sep. 1999.

Fey, Marshall, "Slot Machines," published by Reno-Tahoe Specialty, Inc., pp. 1-34, 1989.

"Fishin' Buddies," article published in Strictly Slots/Anchor Games, published in Apr. 2001.

"Gaming Machine with Animating Symbols," Description, written by IGT, published Jan. 2000.

"Ghoulish Gamble," article written by Strictly Slots/IGT, published Sep. 2000.

Gold Fever Advertisement, written by Atronic Casino Technology, Ltd., published 1999.

"Gooooaal!" written by Bally Gaming, Inc., published Dec. 2000.

Hot Hot Penny Series Game Description [online] [retrieved on Jan. 21, 2008, available prior to Sep. 28, 2007.] Retrieved from the Internet at <URL: http://www.videoslotmachines.com>. (PDF Attached).

"It's a Blast," written by IGT, published on or before Dec. 2004.

Jewel in the Crown Advertisements, written by Barcrest Ltd., published 1999.

Joker's Wild Advertisement written by IGT, published prior to 2001.

"Juicy Loot" by Bally Technologies, article from Strictly Slots, published Feb. 2008.

Kaboom game Web Site, including relevant portions of multiple web pages, written by WMS Gaming, http://www.wmsgaming.com/products/video/kaboom/index.php, published prior to Sep. 9, 2005.

Kaboom game website, written by WMS Gaming, published on or before Nov. 2007.

Loco Loot Article written by Strictly Slots/Aristocrat Leisure Industries, PTY Ltd., published in May 2002.

"Mountain Money," article written by Strictly Slots/Aristocrat Leisure Industries, PTY Ltd., published in Jun. 2002.

Mystery Mine Advertisement, Konami Australia Pty. Ltd., published Jan. 1999.

On the House Advertisement written by Olympic Video Gaming, published prior to 2002.

Penguin Pays Advertisement written by Aristocrat Incorporated, published in 1998.

Penguin Pays Article written by Strictly Slots/Aristocrat Leisure Industries published in Apr. 1999.

"REEL MAGIC™ Gaming Machine," Description written by IGT, available in 1986.

South Park Advertisement, written by IGT, published Sep. 1999.

"Symbol Feature in Australian UFO Gaming Machine," Description written by Barcrest, Ltd., published 1995.

"Traveling Symbols," Description, written by IGT, published Sep. 1999.

Wild Bear Salmon Run Advertisement written by IGT, published in 2003.

Wild Streak Advertisement written by WMS Gaming, Inc., published in 2001.

Wolf Run Video Slots Advertisement, written by IGT, published prior in 2006.

Your Real Key to Gaming Success Advertisement (including Roll Over Beethoven and Wild Fortune) written by Olympic Video Gaming, available prior to Jun. 2007.

Letter from Reina Kakimoto of Mots Law dated Apr. 9, 2012 regarding Third Party Submission in Published Application Under 37 C.F.R. 1.99 filed for U.S. Appl. No. 12/853,050 (1 page).

Third Party Submission in Published Application Under 37 C.F.R. 1.99 filed for U.S. Appl. No. 12/853,050, dated Apr. 9, 2012 (3 pages).

Partial JP 2009-207663A and English translation of paragraph [0011] of same submitted with Third Party Submission in Published Application Under 37 C.F.R. § 1.99 for U.S. Appl. No. 12/853,050 (3 pages), dated Sep. 17, 2009.

Partial JP 2004-789A and English translation of paragraphs [0008] and [0009] of same submitted with Third Party Submission in Published Application Under 37 C.F.R. § 1.99 for U.S. Appl. No. 12/853,050 (3 pages), dated Jan. 8, 2004.

50 Lions, written by videoslotmachines.com, published prior to 2007.

GoldFever Atronic Web Site, written by Atronic Casino Technology, published Mar. 2002.

GAMING SYSTEM, GAMING DEVICE, AND METHOD FOR PROVIDING A CASCADING SYMBOL GAME INCLUDING SHIFTING DIFFERENT DETERMINED SYMBOLS

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide awards to players in primary or base games are well known. These gaming machines generally require the player to place or make a wager to activate the primary or base game. In many of these gaming machines, the award is based on the player obtaining a winning symbol or winning symbol combination and on the amount of the wager (e.g., the higher the wager, the higher the award). Generally, symbols or symbol combinations which are less likely to occur result in higher awards. In such known gaming machines, the amount of the wager made on a play of the base game by the player can vary.

Gaming machines which provide cascading symbol games are also known. In one such cascading symbol game, a gaming machine generates and displays a plurality of symbols in a plurality of symbol positions. The gaming machine evaluates the displayed symbols and provides an award for each winning symbol combination formed, if any. The gaming machine then removes the displayed symbols that form the winning symbol combination(s), creating one or more empty symbol positions. The gaming machine shifts zero, one, or more of the remaining displayed symbols downward into zero, one, or more of the empty symbol positions. If any empty symbol positions remain after this downward shifting, the gaming machine generates and displays a symbol in each empty symbol position. The gaming machine reevaluates the displayed symbols and provides an award for any winning symbol combinations then-displayed. The gaming machine repeats the steps of removing generated symbols, shifting generated symbols, generating and displaying new symbols, and evaluating generated symbols, so long as winning symbol combinations continue to be formed.

There is a need to increase the excitement and entertainment experienced by people playing gaming machines. There is also a need for new ways of providing better gaming experiences and environments at gaming machines by enabling further player interaction with gaming machines during play. There is a further need for increasing the number of winning symbol combinations generated and the number and values of the awards provided to a player for a single wager on a play of a game.

SUMMARY

Various embodiments of the present disclosure relate to gaming systems, gaming devices, and methods for providing, following a determination of an ending condition during a play of a game, an additional win opportunity if an additional win opportunity triggering condition is satisfied. The gaming system provides the additional win opportunity in addition to any awards determined in the play of the game that occurred prior to the occurrence of the ending condition. In various embodiments, the additional win opportunity includes a cascading symbol feature wherein the player picks one or more symbols to be initially removed during the additional win opportunity. In another embodiment, the gaming system determines any symbols to be initially removed during the additional win opportunity. For the additional win opportunity, the gaming system removes the selected symbols from the arrangement of symbols (such as a symbol matrix) which display the ending condition, shifts remaining symbols to fill resulting empty symbol positions, and generates and displays new symbols to fill any still-remaining empty symbol positions. Following such removal, shifting, and generation, the gaming system provides an award to the player for any winning symbol combinations generated during the additional win opportunity. In one embodiment, this additional cascading symbol feature (which starts after the ending condition) continues until no more winning symbol combinations occur. It should be appreciated that the play of the game prior to the occurrence of the ending condition may or may not include a cascading symbol feature as further discussed below.

The gaming system determines whether the player is eligible to participate in the additional win opportunity based, at least in part, on whether an additional win opportunity triggering condition is satisfied. In one embodiment, the additional win opportunity triggering condition is satisfied if the player provides an optional fee or second wager portion for the play of the game, and if, in exchange for the additional wager, the gaming system subsequently determines to provide the additional win opportunity to the player. In one embodiment, the gaming system enables the player to wager on a play of the game and on the additional win opportunity prior to the start of the play of the game. In this embodiment, a player wager includes a first portion provided in exchange for a play of a primary or base game, and an optional second portion provided in exchange for a chance to participate in an additional win opportunity. In this embodiment, if, for the play of the game, the player does not provide the optional second portion of the wager for a chance at the additional win opportunity, the gaming system does not provide the additional win opportunity for that play of the game. However, if the player provides the wager for the chance at the additional win opportunity, the gaming system makes a determination as to whether to provide the additional win opportunity to the player following the play of the game.

As mentioned above, in one embodiment, the wagering game or first part of the wagering game is a cascading symbol game. The gaming system displays an arrangement of symbol positions for the play of the game, wherein each symbol position is configured to display one of a plurality of symbols which can be evaluated during the play of the game. The gaming system then randomly determines and displays one of the plurality of different symbols in each of the plurality of symbol positions. After the gaming system generates and displays the plurality of symbols in the plurality of symbol positions, the gaming system determines whether any winning symbol combinations are formed by the displayed symbols. If any winning symbol combinations are formed, the gaming system provides an award to the player based on an aspect of the winning symbol combination(s), such as based on the number of symbols in the winning symbol combination(s), the types of symbols in the winning symbol combination(s), the position of the winning symbol combination(s) within the arrangement of symbols, or some other suitable aspect of the winning symbol combination(s).

The play of the game continues if any winning symbol combinations are generated. The gaming system removes each of the symbols of each winning symbol combination from the symbol arrangement, resulting in one or more empty symbol positions. To fill the empty symbol position(s), the gaming system shifts zero or more symbols within the arrangement of symbol positions into appropriate empty symbol positions and/or generates and displays one or more of the plurality of symbols in one or more of the empty symbol positions. After removing symbols from winning symbol combinations and shifting/generating symbols to fill the resulting empty symbol positions, the gaming system determines whether any winning symbol combinations are displayed. If so, the gaming system provides an award to the player. The play of the game continues until a designated ending condition occurs. In one embodiment, the designated ending condition occurs when no winning symbol combinations are displayed in the symbol matrix.

Following the occurrence of the designated ending condition, the gaming system determines whether to provide the player with access to an additional win opportunity. In one embodiment, the determination of whether to provide access to the additional win opportunity is based on an additional win opportunity criteria, such as whether a player has placed a sufficient additional win opportunity wager as mentioned above and a determination has thereafter been made to enable the player to participate in the additional win opportunity. In an alternative embodiment, the additional win, opportunity criteria is satisfied upon the player providing an additional wager amount following the occurrence of the designated ending condition. In another alternative embodiment, access to the additional win opportunity is provided based on a determination made by the gaming system, such as based on a random determination or based on a determination made according to a player's status within a player tracking system.

If the determination is to provide the additional win opportunity, the disclosed additional win opportunity commences by determining one or more displayed symbols to remove from the symbol arrangement. The additional win opportunity is provided independent of and in addition to the play of the game that occurred prior to the occurrence of the ending condition. In one such embodiment, the additional win opportunity includes removing one or more symbols from the arrangement of symbol positions independent of the use of those symbols prior to the occurrence of the designated ending condition. For example, the gaming device removes one or more symbols despite such removed symbol(s) not being included in any winning symbol combination at the time of the occurrence of the designated ending condition. In one embodiment, upon determining that the additional win opportunity is to be provided to the player (e.g., because the player provided a sufficient wager to enable access to the additional win opportunity), the gaming system enables the player to determine one or more symbols for removal. In another embodiment, the gaming system determines which of the displayed symbols to remove from the symbol arrangement, which determination may be randomly made or may be based on a designated set of symbols removable during the additional win opportunity. In one embodiment, during the disclosed additional win opportunity, the gaming system removes one or more designated symbols which are determined prior to the play of the game. Alternatively, the disclosed gaming system removes one or more of a particular type of symbol, removes one or more symbols in one or more symbol positions of the symbol arrangement without regard for which symbols are in such symbol positions, or removes some other set of symbols from the symbol arrangement.

After determining which symbols to remove, the gaming system continues the additional win opportunity to potentially generate one or more winning symbol combinations. During the additional win opportunity, the gaming system removes any determined symbols from the symbol arrangement and shifts displayed symbols or generates and displays additional symbols from the plurality of symbols to fill the empty symbol positions, as described above with respect the play of the game prior to the occurrence of the designated ending condition. In one embodiment, the gaming system determines whether any winning symbol combinations are displayed following the additional win opportunity shifting and generating, and provides an additional award to the player as appropriate. In one embodiment, if any winning symbol combinations are displayed, the gaming system again removes symbols and fills empty symbol positions as described during the additional win opportunity—that is, the additional win opportunity proceeds in this embodiment until no further winning symbol combinations are displayed.

It is thus an advantage of the disclosed gaming system to provide a player with an additional win opportunity following an occurrence of a designated ending condition in a play of a game, such as following a determination that no winning symbol combinations are displayed, by removing one or more player-selected symbols from the symbol arrangement. It is a further advantage of the disclosed gaming system to remove designated symbols or randomly determined symbols from the symbol arrangement during the additional win opportunity as disclosed herein upon an occurrence of a designated ending condition.

Additional features and advantages are described in, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
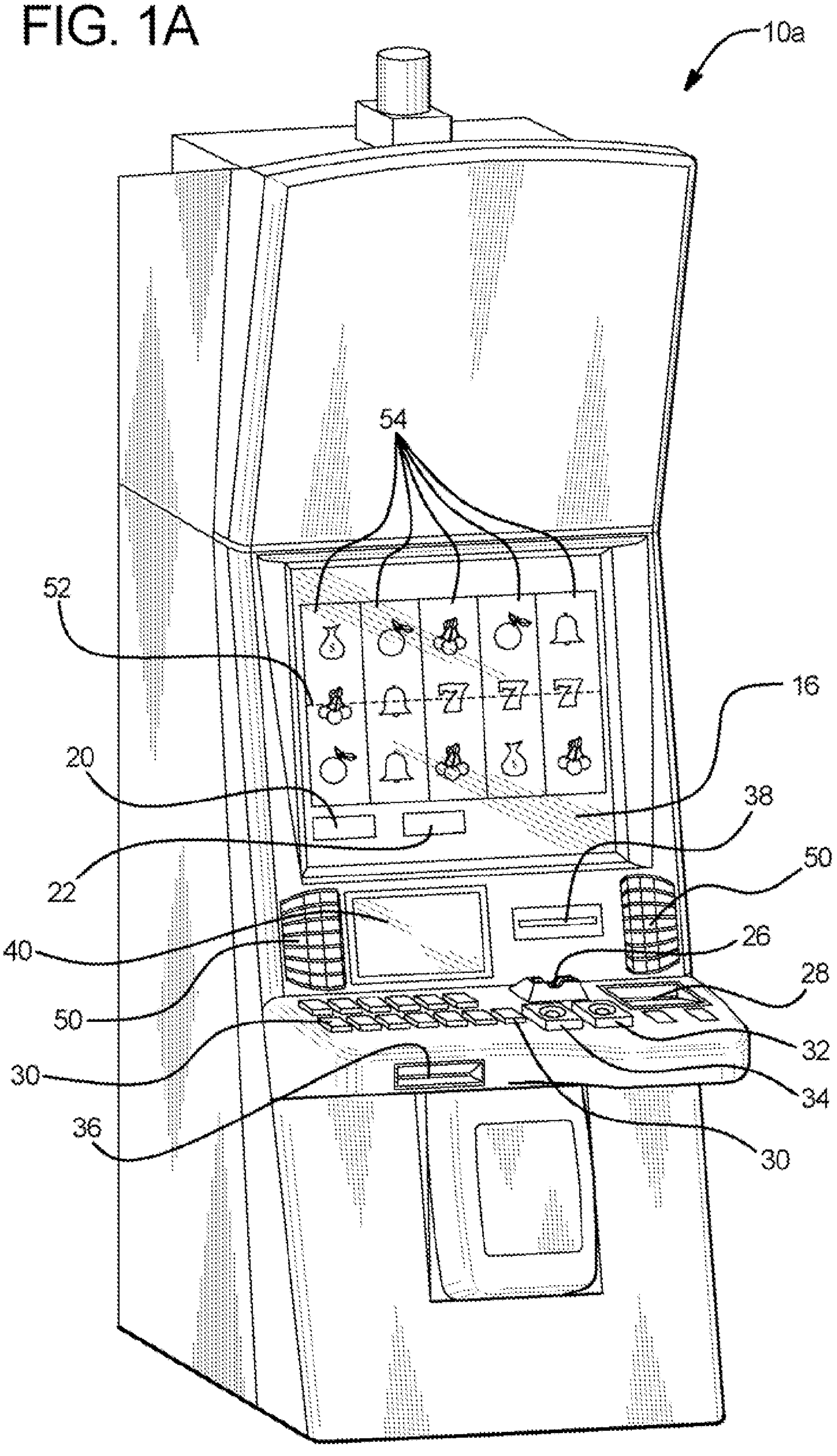
FIGS. 1A and 1B are perspective views of example alternative embodiments of the gaming device of the present disclosure.
Figure 1B:
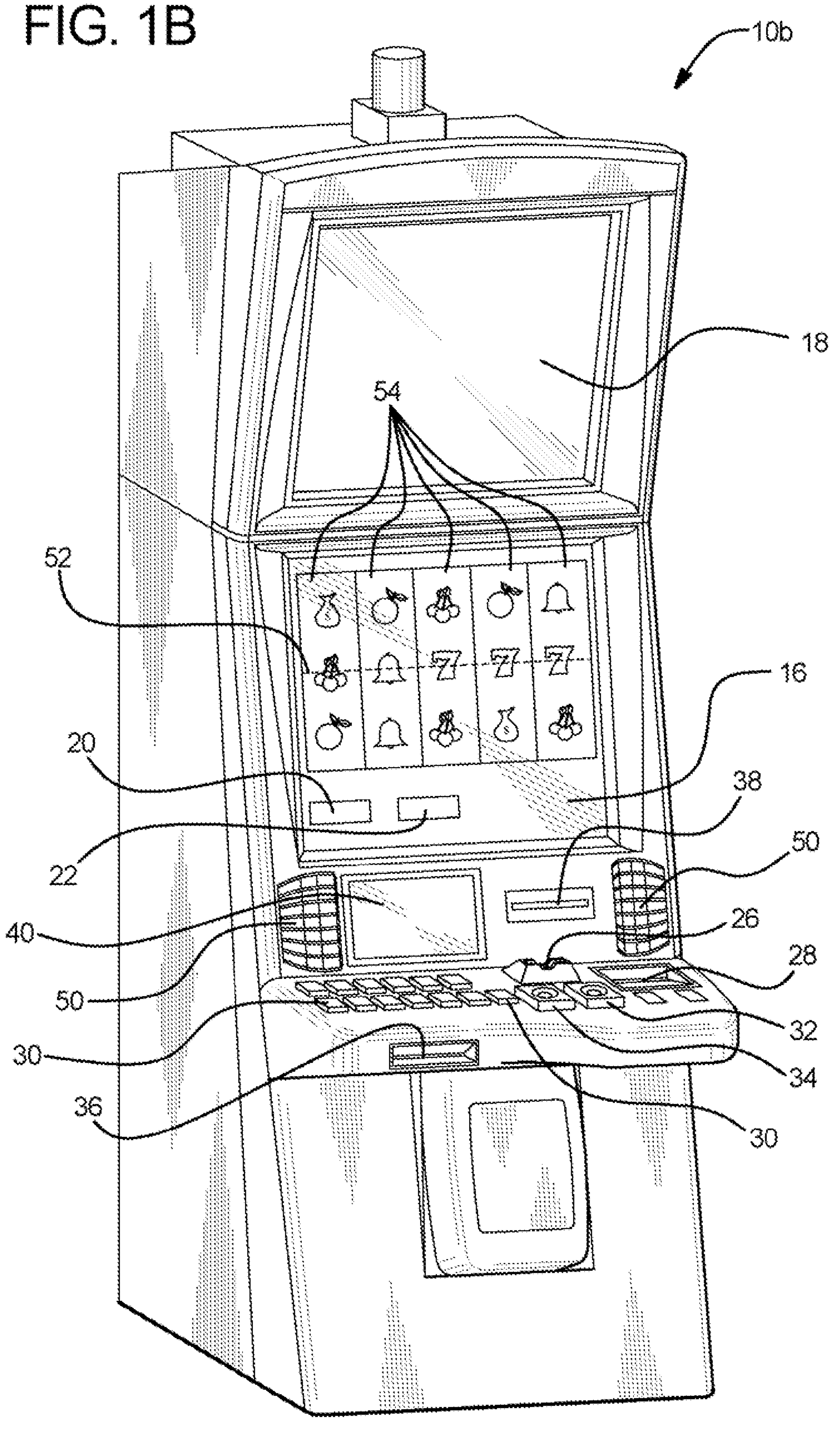

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
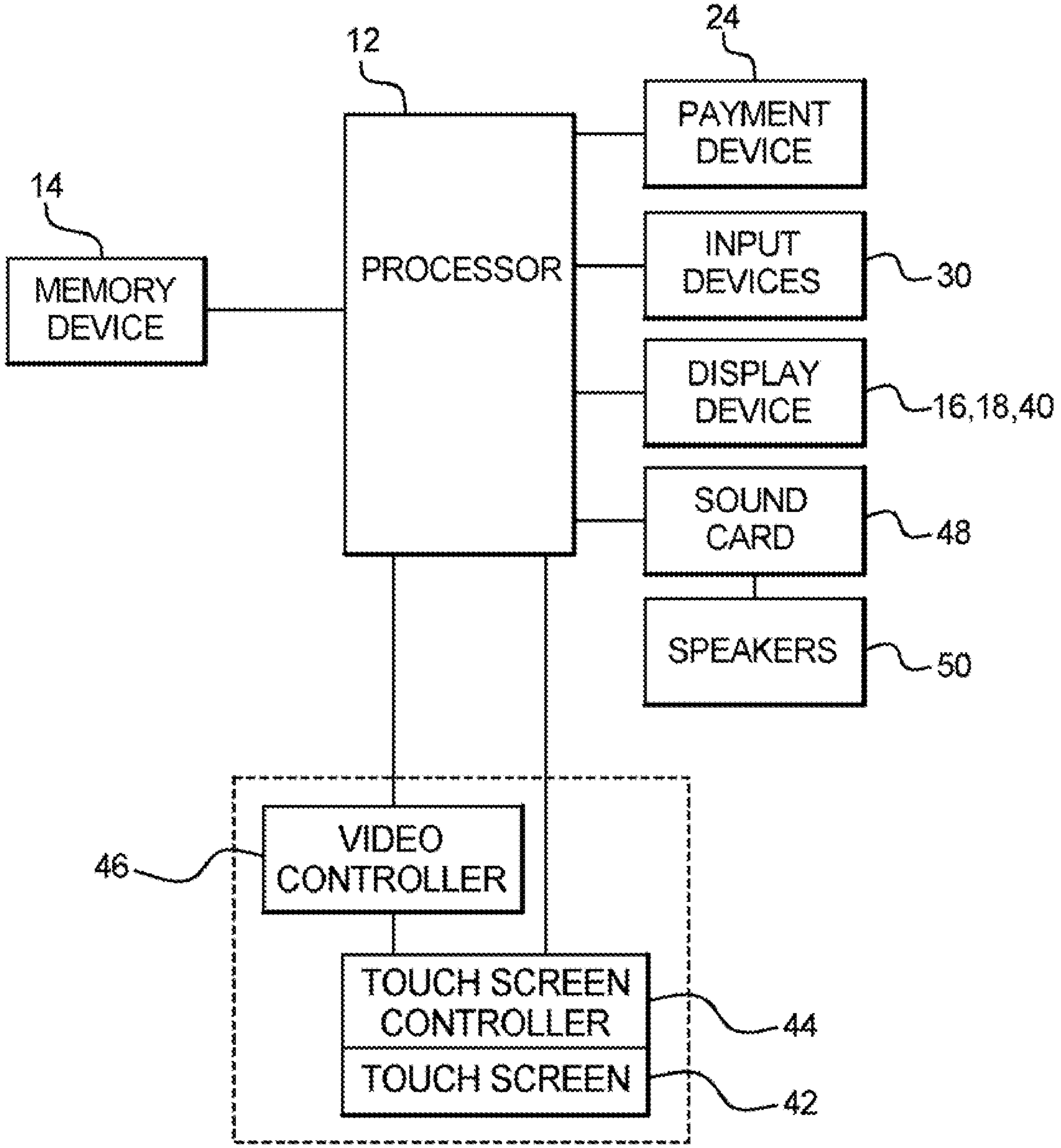
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a hand-held device, such as a personal digital assistant (PDA), a portable computing or mobile device, or another computerized platform to implement the present disclosure. In one embodiment, the gaming device or gaming machine disclosed herein is operable over a wireless network, for example as part of a wireless gaming system. In one such embodiment, the gaming machine may be a hand-held device, a mobile device, or any other suitable wireless device that enables a player to play any suitable game at a variety of different locations. In various embodiments in which the gaming device or gaming machine is a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller, or (c) any suitable combination of the central server or central controller and the hand-held device, mobile device or other suitable wireless device. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the players electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a primary or base game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a primary or base game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the primary or base game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a primary or base game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a primary or base game, the gaming device may also give players the opportunity to win credits in a bonus or secondary game or in a bonus or secondary round. The bonus or secondary game enables the player to obtain a prize or payout in addition to the prize or payout, if any, obtained from the primary or base game. In general, a bonus or secondary game produces a significantly higher level of player excitement than the primary or base game because it provides a greater expectation of winning than the primary or base game, and is accompanied with more attractive or unusual features than the primary or base game. In one embodiment, the bonus or secondary game may be any type of suitable game, either similar to or completely different from the primary or base game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the primary or base game. In another embodiment, after a player has qualified for a bonus game, the player may subsequently enhance his/her bonus game participation through continued play on the primary or base game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
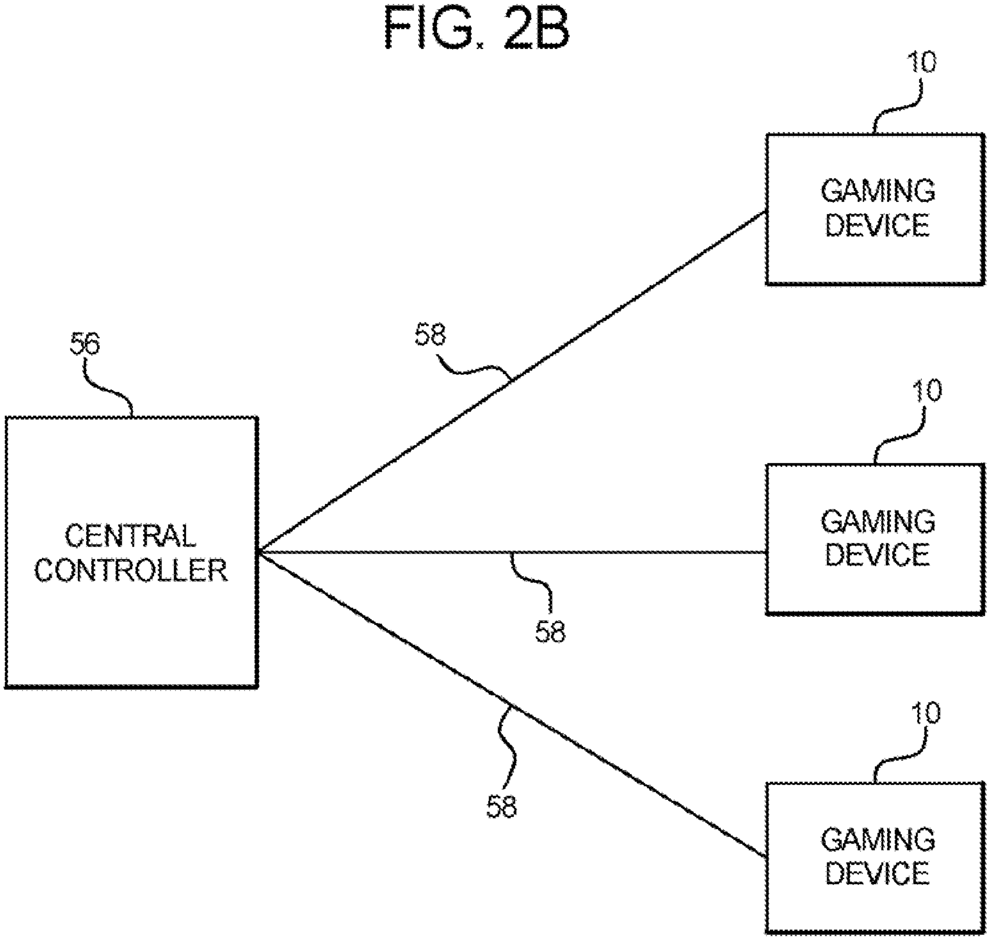
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the players anniversary, the players recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other Internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or static on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a primary or base game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Cascading Symbol Game Providing Additional Win Opportunity Including Removing Non-Winning Symbols In one embodiment, the disclosed gaming system provides an additional win opportunity, including a cascading symbol feature, following an occurrence of an ending condition during a play of a game. The gaming system provides the additional win opportunity in response to additional win opportunity criteria being satisfied. The additional win opportunity criteria may include a determination as to whether the player provided an optional portion of a wager on a play of a game.

In one embodiment, the gaming system provides a play of the game including a cascading symbol feature. For the play of the game, the gaming system displays a plurality of symbols in a plurality of symbol positions, and determines whether any winning symbol combinations are displayed. If any winning symbol combinations are displayed, the gaming system provides an award to the player and removes at least one symbol from at least one winning symbol combination. After removal, the gaming system fills the resulting empty symbol positions by shifting symbols within the arrangement of symbols and/or by randomly generating symbols to fill then-empty symbol positions.

In one embodiment, the gaming system enables a player to access an additional win opportunity following the determination that a designated ending condition has occurred. If, during play of the game, the gaming system determines that a designated ending condition has occurred (e.g., by determining that no winning symbol combinations are displayed, either initially or following filling of empty symbol positions), the gaming system determines whether to provide an additional win opportunity to the player. In one embodiment, this determination is based on appropriate additional win opportunity criteria, such as whether the player made a wager associated with the additional win opportunity prior to the play of the game.

The additional win opportunity in one embodiment of the disclosed gaming system includes a cascading symbol feature. During such an additional win opportunity, the gaming system removes one or more symbols from the arrangement of symbol positions and shifts or generates symbols to fill the empty symbol positions. If any winning symbol combinations are displayed, the gaming system provides an appropriate additional award for the additional win opportunity. The additional win opportunity may thereafter end, or alternatively may continue with the removal of one or more symbols, shifting of zero or more symbols, generating of one or more symbols, and determination of any award based on any then-generated winning symbol combinations, as described with respect to the play of the game.

Figure 3:
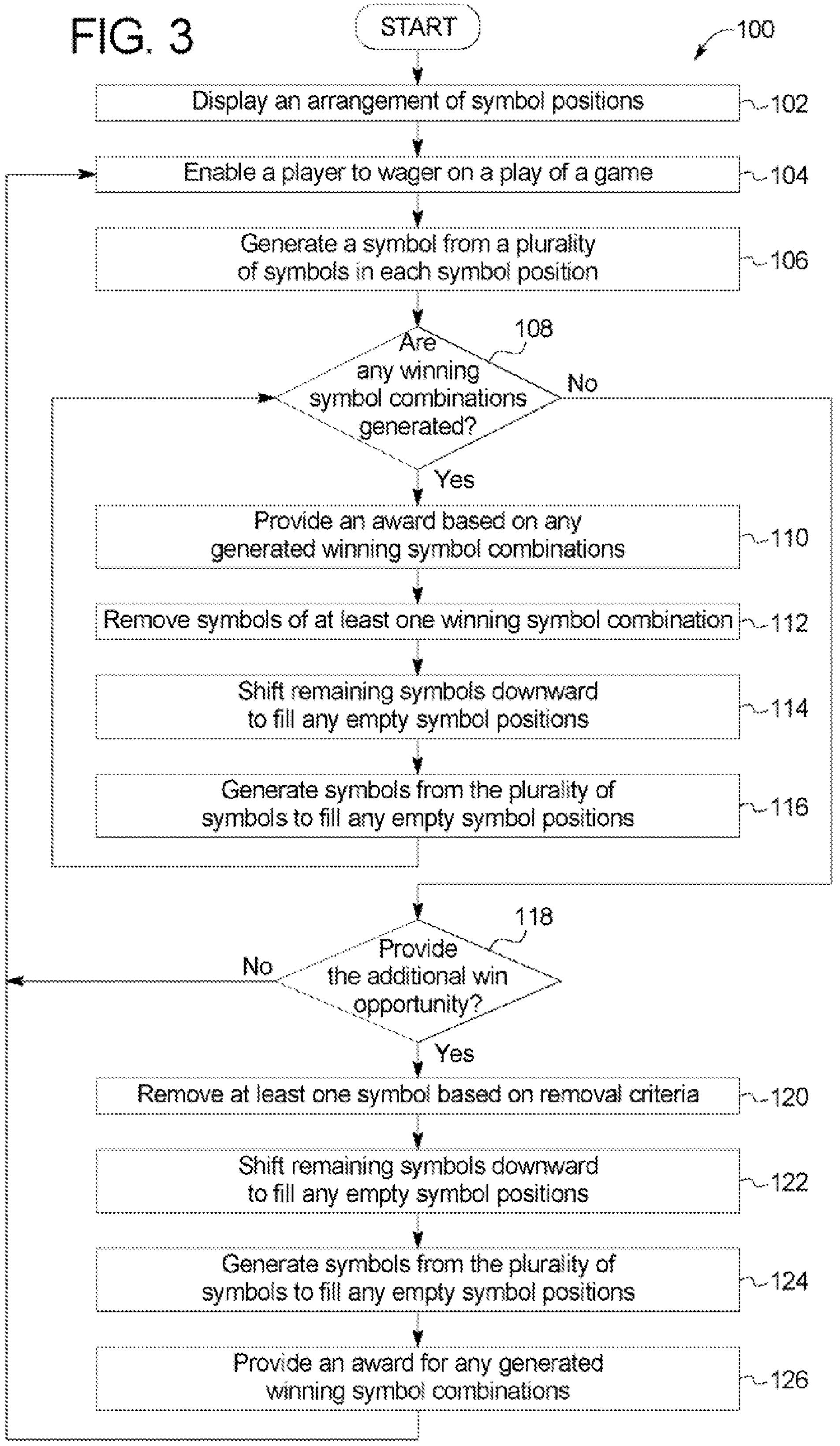
FIG. 3 is a flow chart of an example process for operating the gaming system disclosed herein.

FIG. 3 illustrates a flow chart of an example process 100 for operating the gaming system disclosed herein. Although the example process 100 is described with reference to the flow chart illustrated in FIG. 3, other methods of operating a gaming system are contemplated. For example, the order of certain of the steps of process 100 may be changed, and certain of the steps of process 100 are optional.

According to the illustrated embodiment of the process 100 for operating the disclosed gaming system, the process 100 begins with the gaming system displaying an arrangement of symbol positions, as indicated by block 102, and by enabling a player to wager on a play of a game, as illustrated by block 104. In one embodiment, a first portion of the wager amount is associated with the play of the game, and a second portion of the wager amount is an optional wager portion associated with the additional win opportunity, such that if the player elects to provide the optional wager portion, player qualifies for the gaming system to make a determination whether the player is eligible for participation in the additional win opportunity.

Upon receiving a wager, the gaming system generates one of a plurality of symbols in each symbol position of the arrangement of symbols for the play of the game, as indicated by block 106. The gaming system then determines if the game ending condition has occurred by determining if any winning symbol combinations are generated, as indicated by diamond 108. If the game ending condition has not occurred (i.e., if at least one winning symbol combination is generated), the gaming system provides an award to the player based on the generated winning symbol combinations, as indicated by block 110. The gaming system thereafter removes the symbols from at least one winning symbol combination, as indicated by block 112, and shifts the remaining symbols downward, where possible, to fill any empty symbol positions, as indicated by block 114. The gaming system fills any then-remaining empty symbol positions (i.e., after shifting symbols downward where possible) by generating one of the plurality of symbols to fill each such empty symbol position, as indicated by block 116. The gaming system repeats the determination of whether the game ending condition has occurred by determining whether any winning symbol combinations are generated, as indicated by diamond 108.

In one exemplary embodiment, if the gaming system determines that the game ending condition has occurred by determining that no winning symbol combinations are generated during the play of the game, as indicated by diamond 108 (either following initial generation of symbols or following shifting and generation of symbols to fill empty symbol positions), the gaming system determines whether to provide the player with the disclosed additional win opportunity, as indicated by diamond 118. For example, the gaming system may determine whether to provide the additional win opportunity based on whether certain additional win opportunity criteria are satisfied, such as by determining whether the players wager on the play of the game included the optional wager portion providable to be eligible for the additional win opportunity and if so, whether the player. If the determination is to not provide the player with the additional win opportunity, as indicated by diamond 118, the play of the game ends and the gaming system again enables the player to wager on a play of the game, as indicated by block 104.

If, however, the determination is to provide the additional win opportunity to the player (e.g., based on the additional win opportunity criteria), as indicated by diamond 118, the gaming system removes at least one symbol from the arrangement of symbol positions based on appropriate removal criteria, as indicated in block 120. For example, the gaming system removes at least one player-selected symbol, such as by removing each occurrence of a player-selected symbol from the symbol matrix. In one embodiment, the removal criteria do not include the criterion of whether the symbol is included in a winning symbol combination. In this embodiment, the removal of symbols during the additional win opportunity is independent of the play of the game prior to the occurrence of the designated ending condition.

Following symbol removal according to removal criteria, the gaming system shifts any remaining symbols downward as far as possible to fill empty symbol positions, as indicated by block 122. The gaming system thereafter generates and displays symbols from the plurality of symbols to fill any then-remaining empty symbol positions, as indicated by block 124. In this illustrated embodiment, the gaming system provides any additional award for the additional win opportunity—that is, the gaming system provides an award based on any generated winning symbol combinations displayed in the arrangement of symbol positions, as indicated by block 126.

In the illustrated embodiment, after providing any award for the additional win opportunity, as indicated by block 126, the gaming system enables the player to begin a new play of the game by placing another wager on the play of the game, as indicated by block 104. It should be appreciated that in other embodiments, following a determination that at least one winning symbol combination is displayed during the additional win opportunity, the gaming system removes one or more symbols from the winning symbol combination and fill the resulting empty symbol positions by shifting and/or generating symbols, as discussed above. In this embodiment, the additional win opportunity thus provides a player with an opportunity to generate a plurality of winning symbol combinations during a single additional win opportunity.

FIGS. 4A, 4B, 4C, 4D, 4E, 4F, 4G, and 4H, are front elevation views of a display device 16 of one embodiment of a gaming device of the gaming system disclosed herein. Specifically, the embodiment of the disclosed gaming system illustrated in FIGS. 4A, 4B, 4C, 4D, 4E, 4F, 4G, and 4H, operates according to the process 100 described above with respect to FIG. 3.

In the embodiment illustrated in FIGS. 4A, 4B, 4C, 4D, 4E, 4F, 4G, and 4H, the gaming system displays a screen 150 using the display device 16 of the gaming device illustrated in FIG. 1A. In the illustrated embodiment, the screen 150 includes a symbol matrix 160 having a plurality of symbol positions arranged as a plurality of rows and a plurality of columns of symbol positions. Specifically, the symbol matrix 160 includes three rows of symbol positions 154*a*, 154*b*, and 154*c* and five columns of symbol positions 152*a*, 152*b*, 152*c*, 152*d*, and 152*e*. The gaming system also displays a game information display area 170, in which the gaming system displays messages and other information to a player about the status of a play of the game. The gaming system displays an award display area 180, in which the gaming system displays the players accumulated award for a play of the game.

In the illustrated embodiment, the game information display area 170 includes a plurality of areas which each display particular status information about a play of the disclosed game. Specifically, the game information display area 170 includes a primary wager display area 172 and an additional win opportunity wager display area 174. In the illustrated embodiment, the primary wager display area 172 indicates a wager (or a portion of a wager) made by a player on a play of the game, and is not associated with any additional win opportunity. Thus, in exchange for the wager indicated in wager area 172, the disclosed gaming system enables the player to play the game. Likewise, in the illustrated embodiment, the additional win opportunity wager display area 174 indicates a wager (or a portion of a wager) made by a player on an additional win opportunity following completion of the play of the game. Thus, in exchange for the wager indicated in additional win opportunity wager area 174, the disclosed gaming system enables the player to participate in the additional win opportunity following the play of the game. It should be appreciated that in other embodiments, as discussed in more detail below, a player is not required to provide an additional wager in exchange for the ability to participate in the additional win opportunity, or is not guaranteed entry simply for having made such an additional wager.

The illustrated game information display area 170 also includes a game status display area 176 that is configured to display an indication, such as a textual indication, of the status of the play of the game at certain points in time during the play of the game. Specifically, the game status display area 176 is configured to display information indicating what has occurred (e.g., whether a winning symbol combination was generated) and/or what will occur (e.g., whether symbols will be removed, shifted, or generated).

For plays of the game in the embodiment illustrated in FIGS. 4A, 4B, 4C, 4D, 4E, 4F, 4G, and 4H, the gaming system randomly generates one of a plurality of symbols in each of the plurality of symbol positions. Specifically, the gaming system is configured to generate symbols selected from the group consisting of "7 symbols," "8 symbols," "9 symbols," "10 symbols," "J symbols," "Q symbols," "K symbols," and "A symbols." The gaming system determines whether winning symbol combinations exist based on whether combinations of the same symbols are displayed in designated predetermined winning symbol patterns within the symbol matrix. It should be appreciated that in various embodiments, other sets of symbols, other sets of winning symbol combinations, and other sets of designated patterns could be used with the disclosed gaming system.

Figure 4A:
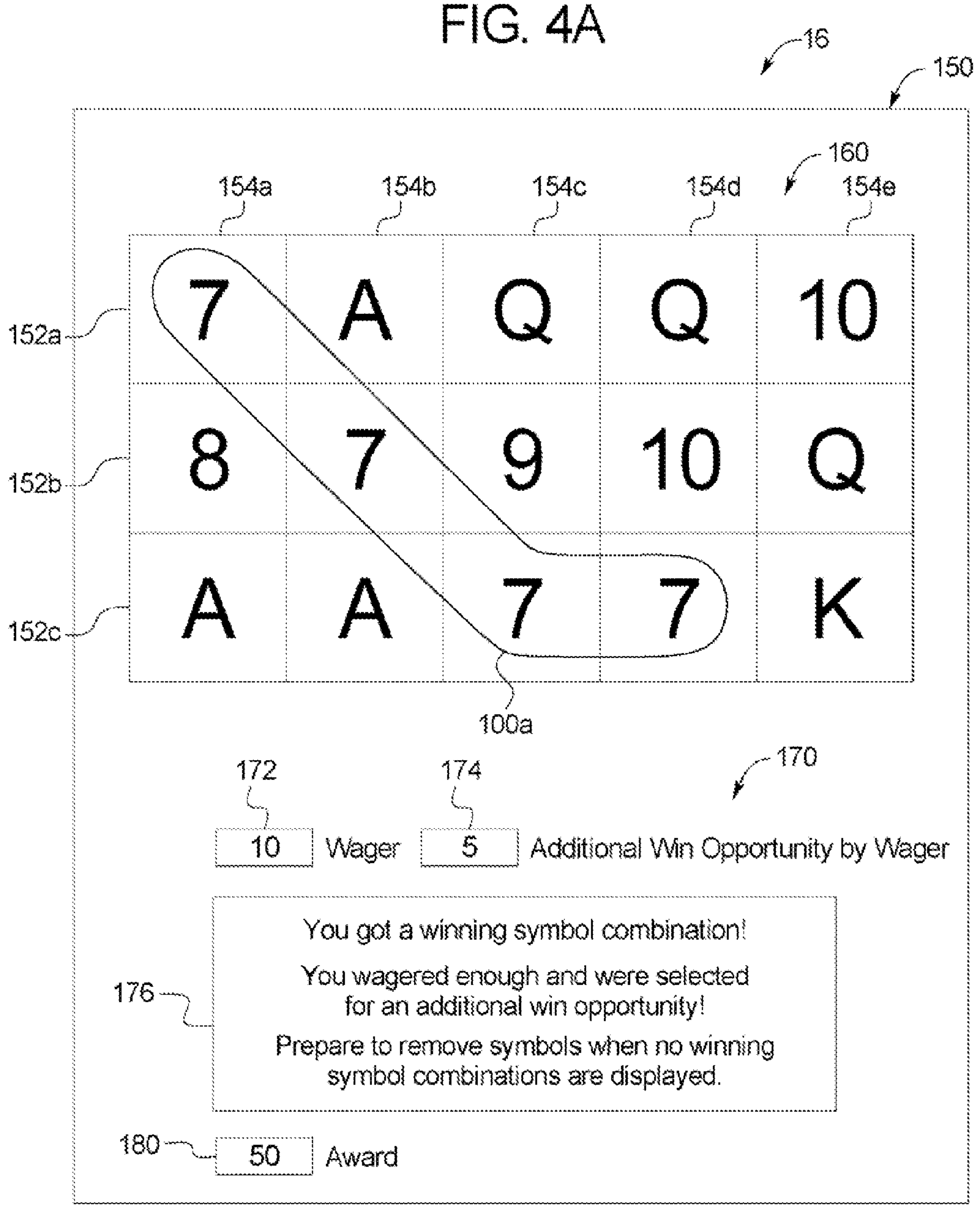
FIGS. 4A, 4B, 4C, 4D, 4E, 4F, 4G, and 4H are front elevation views of one embodiment of a display device of the gaming system disclosed herein.

Referring now specifically to FIG. 4A, in the illustrated embodiment, the gaming system is configured to enable a player to wager on a play of a game and to elect to wager on an additional win opportunity providable following the play of the game. Specifically, at the point in time illustrated in FIG. 4A, the player wagered ten credits on the play of the game, as indicated in primary wager area 172, and elected to wager five credits on the additional win opportunity, as indicated in additional win opportunity wager area 174. Thus, for the illustrated play of the game, the player's total wager is fifteen credits, and in exchange for those fifteen credits, the gaming system will enable the player to have a chance to participate in the play of the game and in the additional win opportunity.

It should be appreciated that in the illustrated embodiment, five credits represents a large enough or sufficient wager that gaming system enables the player to have a chance to participate in the additional win opportunity. In this embodiment, an amount of a wager on an additional win opportunity may impact the functioning of the gaming system. It should be further appreciated that in the illustrated embodiment, the player's wager on the additional win opportunity is optional—that is, the player can wager on the play of the game, and can participate in the play of the game, without having to risk any additional credits in exchange for the additional win opportunity.

At the point in time illustrated in FIG. 4A, the gaming system has generated and displayed a plurality of symbols in symbol matrix 160, some of which form a winning symbol combination 100*a*. Based on this winning symbol combination 100*a*, the gaming system determines that the designated ending condition has not occurred. Specifically, winning symbol combination 100*a* spans columns 154*a*, 154*b*, 154*c*, and 154*d*, and includes four "7 symbols." In the illustrated embodiment, the game status display area 176 indicates that the player generated a winning symbol combination for the play of the game, and the gaming system displays an award of fifty credits, which is associated with the winning symbol combination, in the award display area 180.

In the illustrated embodiment, the game status display area 176 also displays an indication that the player wagered enough to be eligible to participate in the additional win opportunity. The status display area 176 further displays an indication that the player has been selected to participate in the additional win opportunity. Specifically, because of the player's wager of five credits on the additional win opportunity, as represented by additional win opportunity wager display area 174, the gaming system in the illustrated embodiment informs the player that upon completion of the play of the game (i.e., when the designated ending condition occurs), the gaming system made the determination one or more symbols will be removed and symbols will be shifted, providing the player with the disclosed additional win opportunity.

It should be appreciated that in other embodiments, the gaming system does not guarantee the player the opportunity to participate in the additional win opportunity if the player provides the appropriate wager amount. Rather, in other embodiments, the gaming system makes a determination as to whether to enable the player to participate in the additional win opportunity in the event that the player has provided a sufficient wager to be eligible for the additional win opportunity.

Figure 4B:
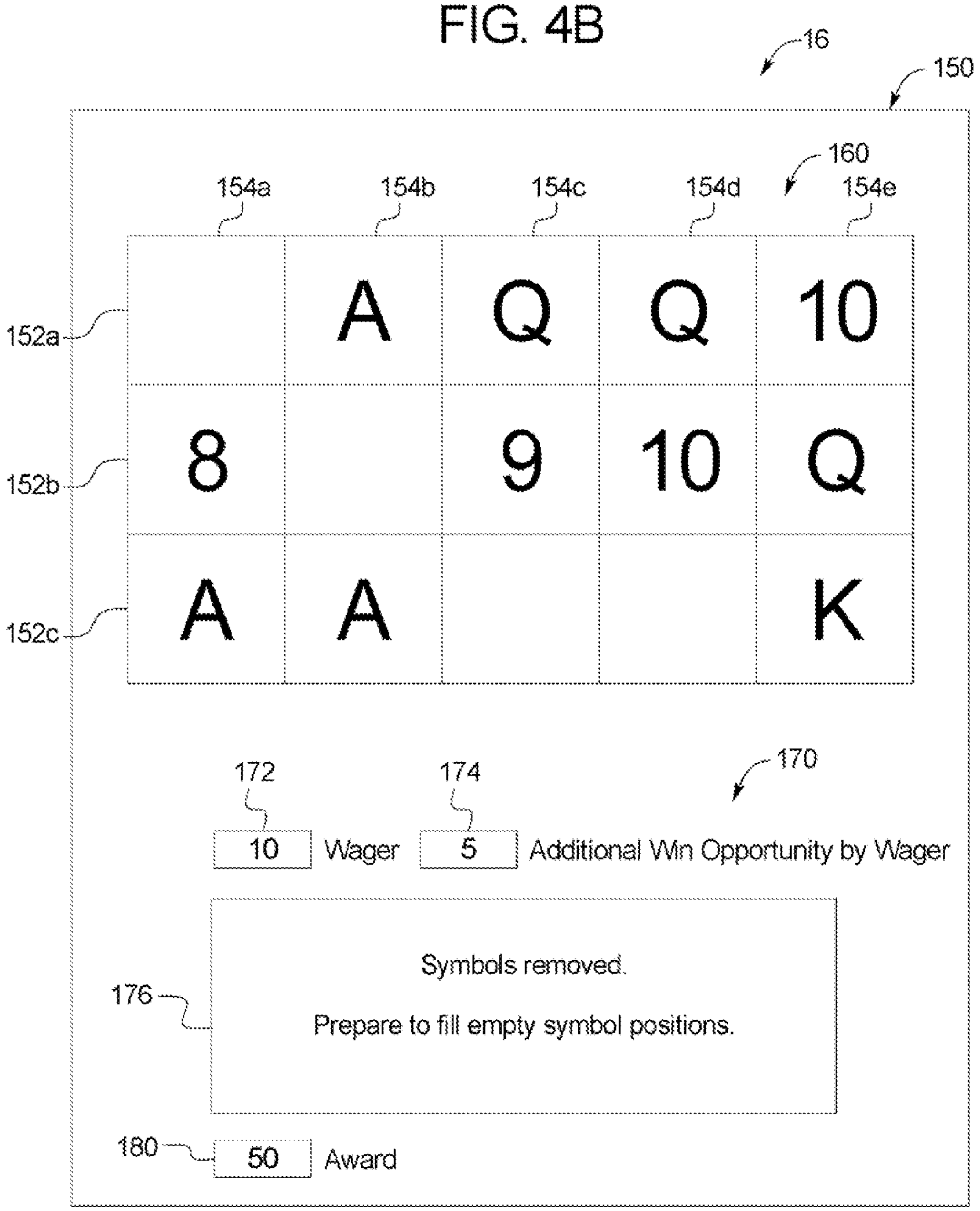

FIG. 4B illustrates a point in time after the symbols from the winning symbol combination 100*a*, illustrated in FIG. 4A, have been removed from the symbol matrix 160. It should be appreciated that the empty symbol positions that remain following such removal will be filled by shifting symbols downward where possible, and by generating additional symbols to fill any then-existing empty symbol positions. In the embodiment illustrated in FIG. 4B, the gaming system displays an indication, in game status display area 176, that the symbols have been removed from the winning symbol combination and that the empty symbol positions will be filled as described.

Figure 4C:
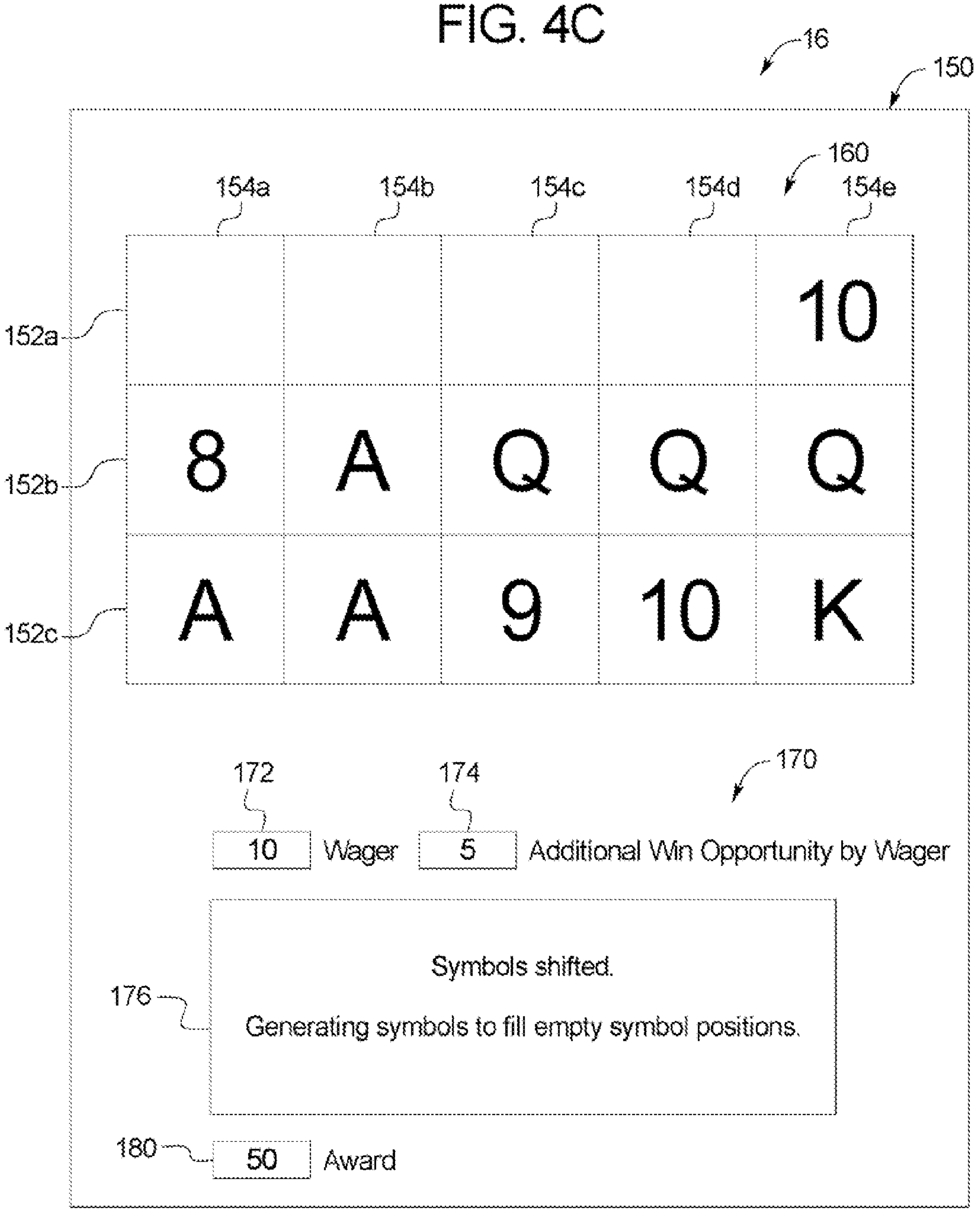

Referring now to FIG. 4C, the display device displays a point in time after shifting available symbols downward to fill the empty symbol positions resulting from removing the symbols of winning symbol combination 100*a*. Specifically, after the shifting illustrated in FIG. 4C, the gaming system displays empty symbol positions at row 152*a*, column 154*a*; at row 152*a*, column 154*b*; at row 152*a*, column 154*c*; and at row 152*a*, column 154*d*. The game status display area 176 displays a message to the player indicating that additional symbols will be generated to fill the empty symbol positions resulting from the described shifting.

Figure 4D:
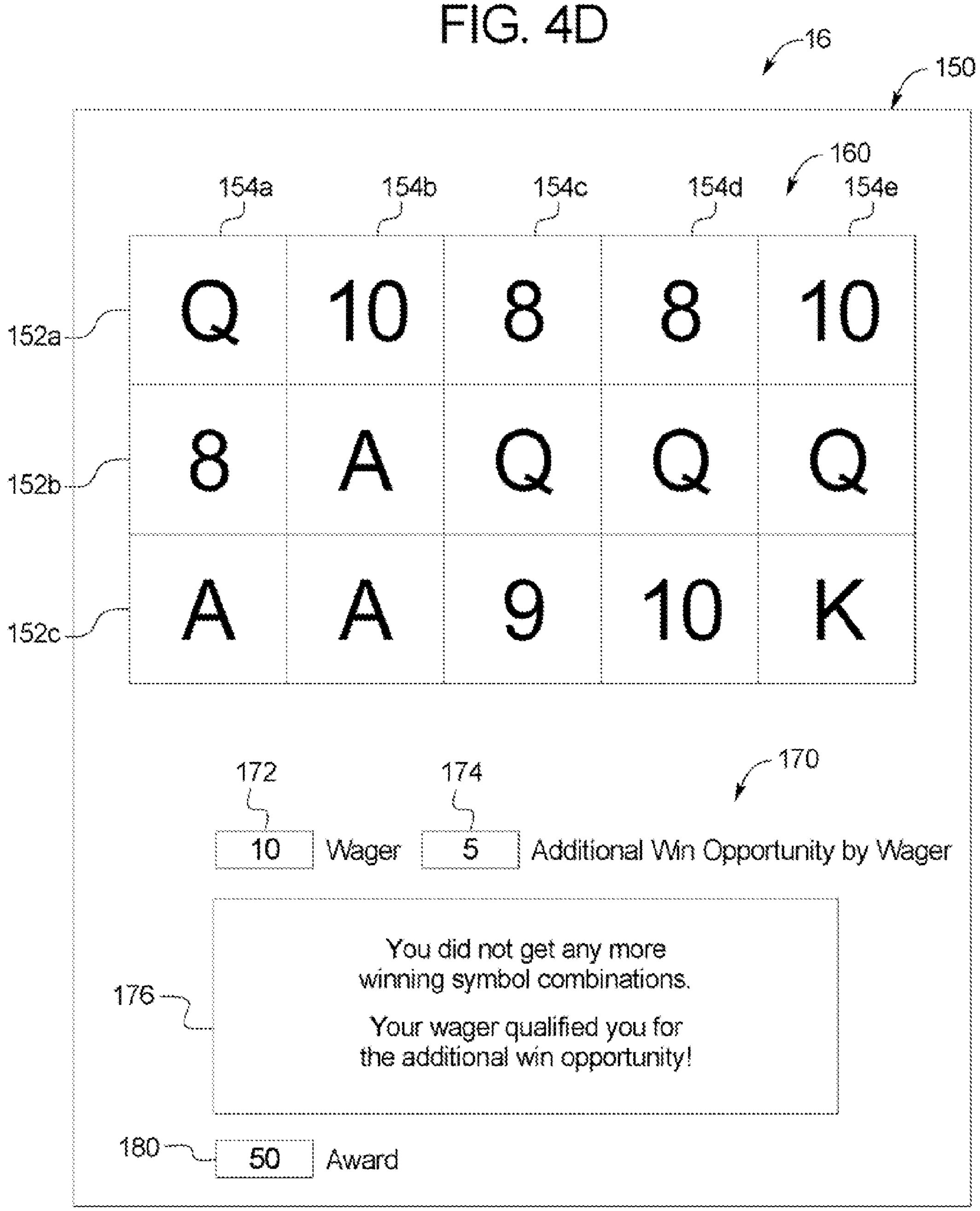

FIG. 4D illustrates a point in time following the shifting of symbols and generation of symbols as described in FIG. 4C. After shifting and generating symbols to fill the previously-empty symbol positions, the gaming system determines whether a designated ending condition has occurred by determining whether any winning symbol combinations are displayed. In the illustrated embodiment, no winning symbol combinations are displayed—thus, the gaming system determines that the designated ending condition has occurred. As a result, the gaming system displays a message at game status display area 176 indicating that the player did not generate any additional winning symbol combinations.

In the illustrated embodiment, since play of the game has ended (i.e., the designated ending condition has occurred), the gaming system also determines whether the player qualifies to participate in the additional win opportunity. Since the player wagered five credits on the additional win opportunity, as indicated by additional win opportunity wager area 174, the gaming system displays a message indicating that the player's wager qualified him or her for the additional win opportunity. In various embodiments, discussed below, the player qualifies for the additional win opportunity based on other criteria, such as based on a random determination, a status of the player as reflected in a player tracking system, or another suitable qualifying mechanism.

Figure 4E:
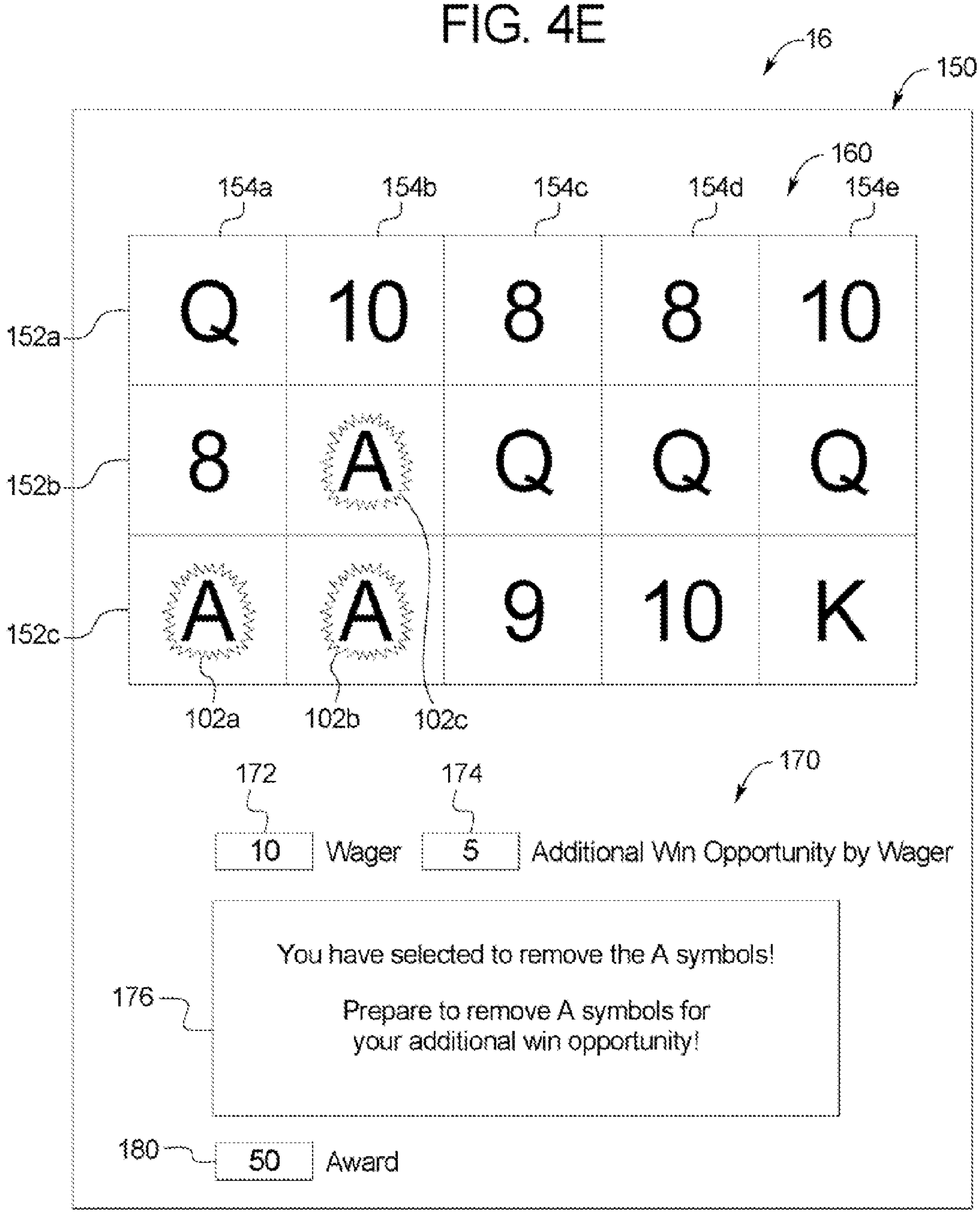

FIG. 4E illustrates a point in time during the additional win opportunity. In this embodiment, the gaming system enables a player to select a particular symbol to remove from the displayed symbol matrix 160. Specifically, the player elected to remove all "A symbols" displayed in the symbol matrix. Thus, in FIG. 4E, the gaming system displays an indication, at game status display area 176, that for the additional win opportunity, the gaming system will remove all "A symbols" from the symbol matrix 160. In the illustrated embodiment, the gaming system displays the "A symbols" of the symbol matrix 160, indicated by numerals 102*a*, 102*b*, and 102*c*, as being highlighted prior to removal to indicate the position of such to-be-removed symbols to the player. In another embodiment, the gaming system determines to remove the "A symbols" from the symbol matrix 160 without input from the player. In alternative embodiments, to be discussed below, the gaming system determines which symbols to remove in the additional win opportunity based, in part, on player input or based on one or more determinations, such as a random determination, made by the gaming system.

Figure 4F:
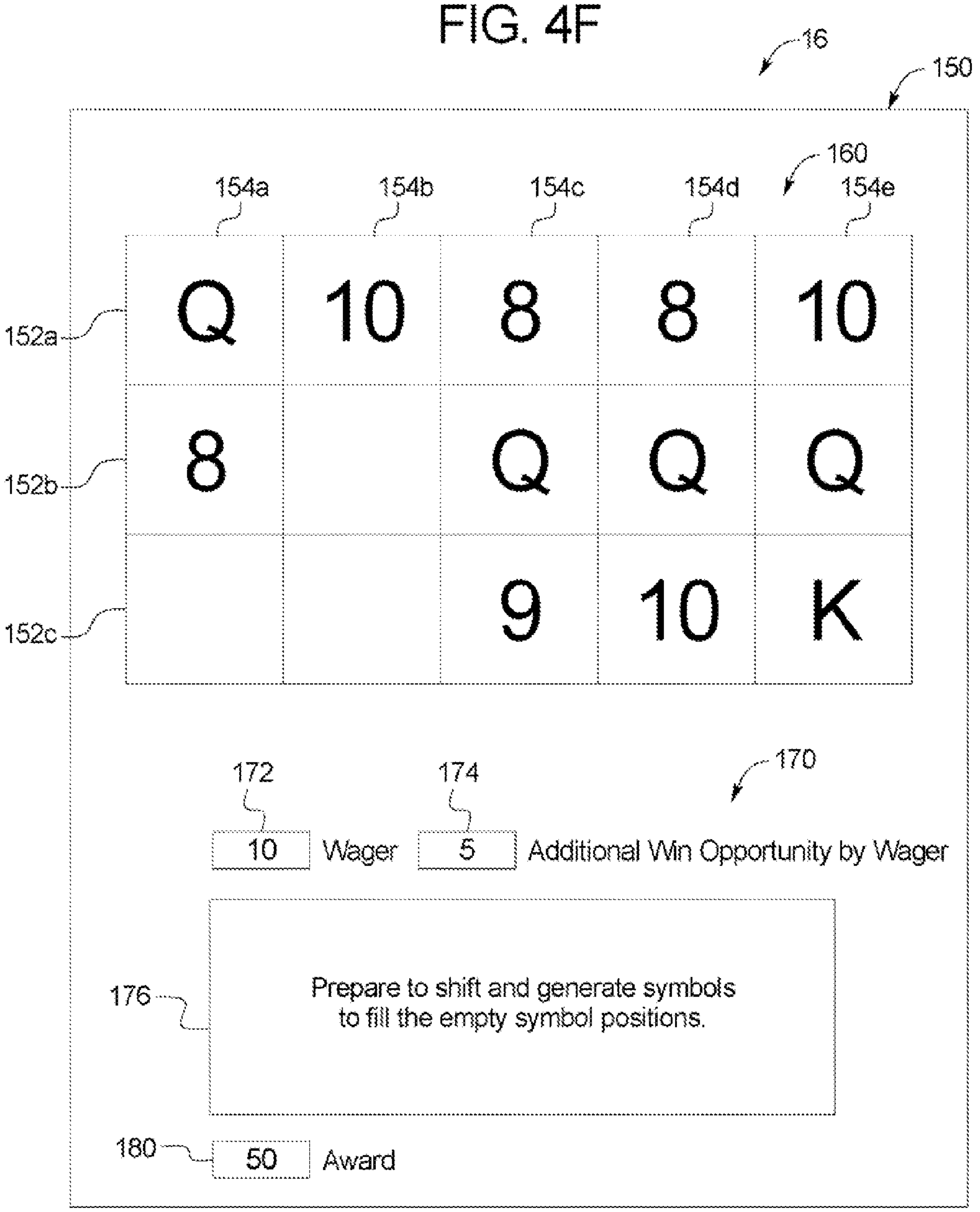

FIG. 4F illustrates a point in time following removal of the three "A symbols," indicated by numerals 102*a*, 102*b*, and 102*c* in FIG. 4D, from the symbol matrix 160. In the illustrated embodiment, removal of the "A symbols" during the additional win opportunity results in three empty symbol positions. The gaming system displays an indication at game status display area 176 that the displayed symbols will be shifted to fill the empty symbol positions, and that any then-remaining empty symbol positions will be filled with newly-generated symbols.

Figure 4G:
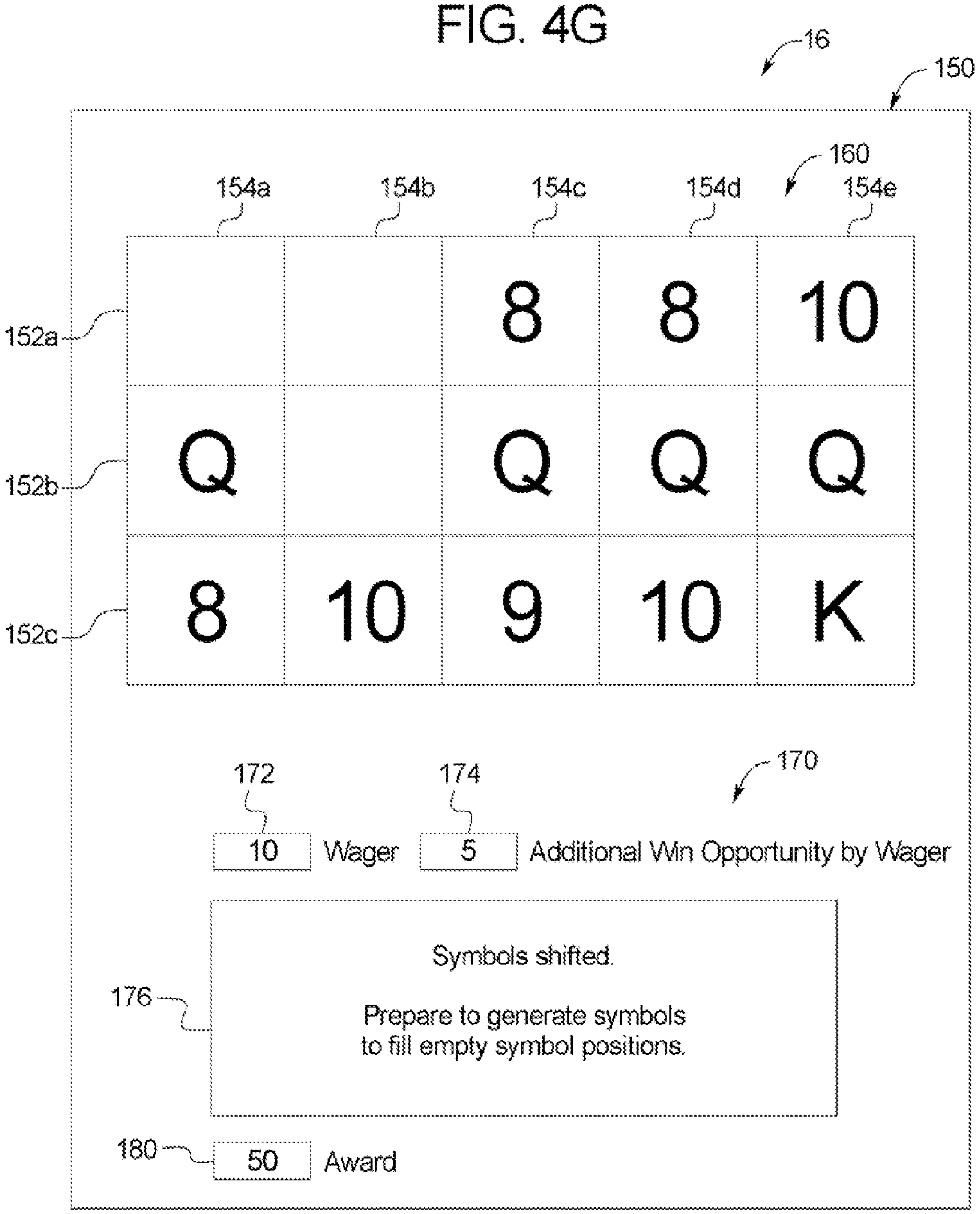

FIG. 4G illustrates a point in time after the "A symbols" have been removed from the symbol matrix 160 during the additional win opportunity, and after the remaining symbols have been shifted downward to fill the empty symbol positions created by removal of the "A symbols." In the illustrated embodiment, the remaining empty symbol positions cannot be filled by shifting symbols downward—thus, the gaming system causes game status display area 176 to display an indication to the player that the symbols have shifted, and that additional symbols will be generated to fill the remaining empty symbol positions.

Figure 4H:
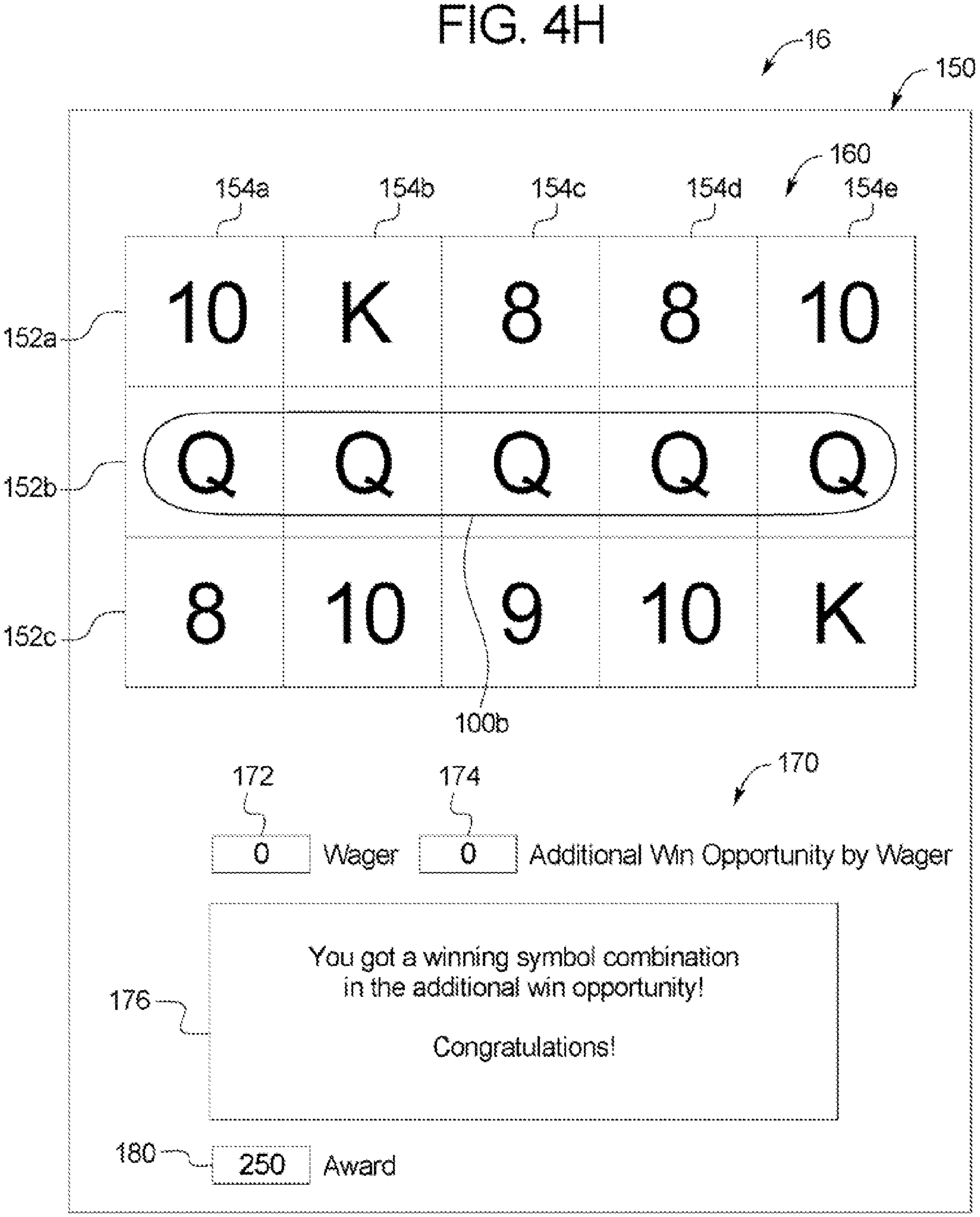

Referring now to FIG. 4H, the disclosed gaming system is illustrated at a point in time after symbols have been generated to fill the empty symbol positions of the additional win opportunity. In the illustrated embodiment, following shifting and generation of new symbols, the gaming system displays a winning symbol combination 100*b* in row 152*b* of symbol matrix 160. It should be appreciated that the winning symbol combination 100*b* represents a win achieved during the additional win opportunity disclosed herein. To this end, game status display area 176 displays an indication that the player obtained a winning symbol combination in the additional win opportunity, and updates the award display area 180 to reflect an award associated with the additional win opportunity. The award display area 180 of FIG. 4H thus indicates that for the play of the game (including the play of the game and the additional win opportunity), the player won an award of two-hundred-fifty credits. That is, the player won an award of fifty credits for the play of the game, and an additional award of two-hundred credits for the additional win opportunity. In the illustrated embodiment, after the winning symbol combination 100*b* is generated, the additional win opportunity ends. It should be appreciated that in other embodiments, discussed in more detail below, the additional win opportunity may continue by, for example, removing the symbols from the winning symbol combination 100*b* and performing the above-described shifting and generating of symbols to fill the empty symbol combinations.

In the illustrated embodiment, the designated ending condition occurs (and the gaming system makes a determination of whether to provide the additional win opportunity) when no winning symbol combinations are displayed in the symbol matrix 160. In other embodiments which are not shown, the gaming system determines whether the designated ending condition occurs, at least in part, based on other criteria, such as based on whether a winning symbol combination associated with a designated award occurs, whether a particular symbol is displayed, or some other appropriate condition. In various embodiments, whether a designated ending condition occurs is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In various embodiments, the gaming system disclosed herein enables the player to participate in the additional win opportunity if one or more additional win opportunity criteria are satisfied. In one such embodiment, such as the embodiment described above with respect to FIGS. 4A, 4B, 4C, 4D, 4E, 4F, 4G, and 4H, the additional win opportunity criteria is satisfied, and the disclosed gaming system enables the player to participate in the additional win opportunity, if the player makes an appropriate wager prior to participating in the play of the game, and if the gaming system subsequently determines that the player is eligible to participate in the additional win opportunity. In another embodiment, the additional win opportunity criteria is satisfied based on a wager by the player placed following the occurrence of the designated ending condition—that is, after a set of symbols is displayed which do not form any winning symbol combination. In another embodiment, the gaming system determines whether to enable the player to participate in the additional win opportunity based, at least in part, on at least one secondary device (such as a wheel, a secondary reel, a pointing device, a top-box display, a light box display, or the like). For example, the gaming system determines whether to enable the player to participate in the additional win opportunity based, at least in part, on a spin of a secondary wheel device associated with the gaming device at which the player is playing.

In one embodiment, the initial wager placed by the player does not include a separate wager amount allocated to the additional win opportunity. Rather, in this embodiment, the wager on the play of the game includes a portion allocated to the play of the game, and a portion allocated to enabling the player to be eligible for the additional win opportunity. In another embodiment, the gaming system enables the player to participate in the additional win opportunity without having to risk any additional credits for the play of the game.

In various embodiments, such as the embodiment discussed above, the disclosed gaming system begins the additional win opportunity by removing at least one symbol from display (such as from the symbol matrix) despite the at least one symbol not being included in any winning symbol combinations. In one embodiment, which symbol(s) are removed from the symbol matrix is predetermined and is not altered during the play of the game. In another embodiment, the gaming system enables the player to select at least one symbol from the symbol matrix which is to be removed following play of the game. In an embodiment, the gaming system removes each instance of a symbol selected by the player. In another embodiment, the gaming system removes each symbol sharing a characteristic with a symbol selected by the player, such as by removing each symbol that is of a same color of a same category as the symbol selected by the player.

In one embodiment, the gaming system randomly selects one or more symbols to remove from the symbol matrix based, in part, on the actual symbol displayed. In a further embodiment, the gaming system randomly selects any symbols to remove from the symbol matrix based, at least in part, on a secondary device associated with the gaming system. For example, the gaming system determines which (if any) symbols to remove based on a spin of a secondary wheel device associated with the gaming device at which the player is wagering on plays of the game.

In another embodiment, the gaming system randomly selects one or more positions of the symbol matrix and removes symbols displayed therein without regard for which symbols are displayed. In one embodiment, the gaming system enables a player to select a symbol position and removes symbols from that symbol position, regardless of which symbols are contained therein. In various embodiments, wherein positions of the symbol matrix are selected (either by the gaming system or by the player), the gaming system removes only those symbols displayed in the selected positions. In other embodiments, the gaming system removes each symbol that matches or shares a characteristic with the symbols displayed in the selected symbol position.

In one embodiment, the gaming system removes all the symbols displayed in the symbol matrix or in a certain pattern of the symbol matrix, such as within a designated row or column of the symbol matrix. In one embodiment, each symbol displayed in the symbol matrix is removed to begin the additional win opportunity. In various other embodiments, which symbols are removed to begin the additional win opportunity is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the players primary game wager, determined based on time (such as the time of day), determined based on an amount of coin-in accumulated in one or more pools or determined based on any other suitable method or criteria. It should be appreciated that the selection of symbols to be removed could further be based on a combination of any of the individual mechanisms disclosed herein.

In one embodiment, after the gaming system removes one or more symbols from the symbol matrix during the additional win opportunity, the gaming system shifts and generates symbols, determines whether any winning symbol combinations are present, provides any award if any winning symbol combinations are present, and ends the additional win opportunity. In another embodiment, the gaming system removes one or more symbols from any winning symbol combinations generated during the additional win opportunity, and fills empty symbol positions by shifting and generating as described, until no further winning symbol combinations are generated. In one embodiment, whether the gaming system removes symbols from winning symbol combinations generated during the additional win opportunity is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system removes sets of designated symbols following a determination that no winning symbol combinations are generated more than once during the additional win opportunity such that at least one winning symbol combination is generated during the additional win opportunity. For example, if the gaming system removes symbols for the additional win opportunity, fills empty symbol positions as described, and determines that no winning symbol combinations are generated for the additional win opportunity, the gaming system may repeat the removal of symbols (such as by removing the same kind of symbol or by removing symbols from the same symbol locations) a second time during the additional win opportunity. It should thus be appreciated that the one embodiment of the disclosed gaming system ensures that a player will win at least some award during the additional win opportunity by removing symbols, shifting symbols, and generating new symbols until at least one winning symbol combination is generated.

In one embodiment, the gaming system provides an additional win opportunity only if a triggering event occurs in the play of the game. For example, a triggering condition may require that three of a certain type of symbol be generated in a play of the game for the additional win opportunity to be provided. In a further embodiment, the additional win opportunity is provided according to or based on the triggering condition that occurred. For example, if the triggering condition required that three of the certain type of symbol be generated during the play of the primary game, the additional win opportunity in one embodiment includes removing each instance of that certain type of symbol during the additional win opportunity and shifting and generating symbols as described herein to fill resulting empty symbol positions.

In one embodiment, during either the play of the game or during the additional win opportunity, the gaming system shifts symbols according to a predetermined rule if the symbols have a predetermined spatial relationship. For example, if the predetermined spatial relationship is satisfied when a symbol is displayed adjacent to and above an empty symbol position, the gaming system may shift symbols downward as far as possible so long as that predetermined spatial relationship exists. In various embodiments, the predetermined spatial relationship exists if a symbol is displayed horizontally adjacent, vertically adjacent, diagonal to, or in some other spatial relationship with an empty symbol position. In various embodiments, the predetermined rule includes shifting symbols one, more than one, or as far as possible in a designated direction. In other embodiments, the predetermined rule includes shifting certain symbols in a first direction and shifting certain other symbols in a different second direction.

In one embodiment, the gaming system enables a player to select one or more symbol locations from which symbols are removed during the additional win opportunity after the play of the game. In another embodiment, the gaming system enables the player to select such locations prior to the play of the game, such that the player does not know which symbols will be removed from the symbol matrix.

In another embodiment, the gaming system displays a pop-up menu to the player, and enables the player to select from among a plurality of different mechanisms, including those mechanisms discussed above, by which to remove symbols from the symbol matrix during the additional win opportunity. In one embodiment, one or more of the mechanisms displayed to the player include an associated price, and the player has the option to provide credits equal to the price of the mechanism in exchange for the gaming system removing symbols according to the selected mechanism. In another embodiment, in exchange for providing a wager prior to the play of the game or prior to the additional win opportunity, the player is provided with a menu containing a plurality of removal mechanisms selected based on the amount of the wager. In various embodiments, the gaming system enables the player to pick which mechanism to use to remove symbols during the additional win opportunity prior to, during, or after the play of the game.

In one embodiment, the gaming system disclosed herein requires the player to risk an amount of credits in exchange for the opportunity to participate in the additional win opportunity. In one embodiment, the amount the player must risk for the additional win opportunity is based on an expected outcome of the additional win opportunity. For example, if a player chooses particular symbols or positions to remove from the symbol matrix, the cost of the opportunity to choose such symbols or positions is based on the expected outcome of removal of the chosen symbols or positions. In one embodiment, wherein which symbols are removed is determined at random, the gaming system requires the player to provide a static or constant fee based on the overall expected outcome resulting from random symbols being removed from the symbol matrix.

In one embodiment, if a player or the gaming system selects one or more symbols to remove from the symbol matrix such that a relatively good outcome is expected, the wager required for that opportunity may be relatively high. Further, if the player or the gaming system picks more symbols for removal during the additional win opportunity, the wager required for that opportunity may be relatively higher.

In one embodiment, the gaming system enables a player to provide a wager in exchange for a package of additional win opportunities. For example, a player may be presented with a package containing different numbers of symbols that can be selected, different options for selecting symbols (such as the option to select symbol locations for removal versus the option to select symbols and to have each instance of such selected symbols be removed), or other variations of selection mechanisms, wherein each option of the package is available if the package is purchased. Thus, a player may purchase a package with ten different options applicable during ten different additional win opportunities, and may use those options as the player sees fit following ten plays of a game. In a further embodiment, the gaming system ranks packages offered to the player, and prices the packages accordingly. For example, the gaming system enables a player to select from a low advantage package, a medium advantage package, and a high advantage package, wherein the wager required for the low advantage package is the lowest and wherein the wager required for the high advantage package is the highest.

In one embodiment, assuming the additional win opportunity criteria are satisfied, an additional win opportunity follows a play of a game regardless of whether the play resulted in a winning outcome. In another embodiment, even if the additional win opportunity criteria are satisfied, an additional win opportunity follows only a losing game outcome or only a winning game outcome. In these embodiments, if the additional win opportunity requires a player to place a wager prior to the play of the game, and the appropriate game outcome does not occur, the wager is returned to the player. Alternatively, the gaming system may only require a wager from a player if the additional win opportunity criteria are satisfied and the player is eligible for the additional win opportunity (i.e., if the appropriate primary game outcome, such as a winning or losing outcome, occurs).

In one embodiment, the gaming system generates one or more new symbols to fill one or more empty symbol positions based on one or more reel strips utilized to generate symbols during the play of the game. In another embodiment, the gaming system varies the order of symbols on the reel strip used to generate the new symbols to reduce the predictability of which symbols will be generated in the empty symbol positions for the play of the game. In one embodiment, this variation of the order of symbols of the reel strip results from a random determination of symbols, such that the reel strip is not relevant to newly generated symbols. In other embodiments, different reel strips are used to generate new symbols. For example, these different reel strips could be especially made for use during the additional win opportunity and could include a uniform symbol frequency, could be normal reel strips, could be reel strips that are especially likely to generate certain symbols (e.g., wild-rich reel strips), or could be other reel strips adapted to provide a player with a desired gaming experience.

In one embodiment, the disclosed additional win opportunity can be provided in association with a game which is not a cascading or tumbling reels game. For example, a known game, played according to its own rules, can be provided to a player. Upon a determination that a designated ending condition has occurred in the play of the game, if the player is eligible to participate in the additional win opportunity, the disclosed gaming system enables one or more symbols from the play of the game to be removed and causes the disclosed shifting and generation to occur. The gaming system thereafter provides awards based on any further winning symbol combinations that are generated. Thus, it should be appreciated that the disclosed additional win opportunity may be provided in association with a non-cascading game and/or may be added to or retrofitted with an existing game, regardless of whether that existing game performed the removal, shifting, and generation of symbols described above.

In one embodiment, the gaming system disclosed herein enables a player to activate a further bonus event or opportunity during the additional win opportunity. For example, if a designated triggering event occurs during the additional win opportunity (e.g., if a certain winning symbol combination is generated), the gaming system in one embodiment enables a player to participate in a further bonus opportunity separate from the additional win opportunity. Thus, it should be appreciated that while the additional win opportunity described above may provide players with awards during the additional win opportunity, the additional win opportunity may also provide players with an opportunity to participate in further plays of one or more games, such as one or more additional bonus games.

In one embodiment, the gaming system is configured to suggest one or more symbols for removal during the additional win opportunity. That is, the gaming system displays to a player a suggested symbol or symbols to remove from the symbol matrix. The suggested symbols may represent a set of "best" or "most advantageous" symbols to remove from the symbol matrix, such that removing the suggested symbols results in the most advantageous expected outcome. In one embodiment, if a player waits for a designated amount of time prior to selecting one or more symbols to remove from the display, the gaming system removes the suggested symbols from the display. In another embodiment, if a player waits longer than a designated amount of time before selecting symbols to remove, the gaming system removes some other (i.e., non-suggested) set of symbols, such as a randomly determined set of symbols or a set of symbols determine according to another mechanism as disclosed herein.

It should thus be appreciated that the disclosed gaming system advantageously enables a player to either win an award for a play of a game that otherwise would have resulted in an award of zero and/or enables a player to increase an amount of an award won for a play of a game beyond that typically available for the play of the game. The disclosed gaming system also advantageously enables a cascading or tumbling feature to be added to a game which is not otherwise a cascading or tumbling game. In addition, the disclosed gaming system increase player excitement and enjoyment by enabling the player to attempt to play a game according to strategy, whether that strategy is actual or perceived. The disclosed gaming system also advantageously enables a player to force a particular type or pattern of cascading or tumbling, such as by causing a symbol on the bottom row of a symbol matrix to be removed and thus causing the symbols above it to cascade or tumble downward, in the hopes of obtaining a larger award or activating some other bonus event.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one input device;

at least one display device;

at least one processor; and at least one memory device which stores a plurality of instructions, which when executed by the at least one processor, cause the at least one processor to operate with the at least one input device and the at least one display device, for a play of a game, to:

(a) display a plurality of symbol positions in a designated arrangement of symbol positions, (b) for each of the symbol positions, display a randomly generated one of a plurality of symbols in said symbol position, (c) determine if the displayed symbols form any game winning symbol combinations, (d) when the displayed symbols form any game winning symbol combinations:

(i) provide an award based on said game winning symbol combinations;

(ii) remove at least one symbol from at least one game winning symbol combination from display, (iii) display one of the plurality of symbols in each of any then-empty symbol positions, and (iv) repeat (c) and (d), and (e) when the displayed symbols do not form any game winning symbol combinations:

(i) determine whether to provide an additional win opportunity, said determination being independent of the displayed symbols, (ii) when the determination is to provide the additional win opportunity:

(A) remove at least one symbol from display based on at least one removal criterion, (B) cause any symbol which is displayed in a predetermined spatial relationship with any empty symbol position to shift in to that empty symbol position according to a predetermined rule, (C) after said shifting, generate one or more of the plurality of symbols in each of any then-empty symbol positions, (D) determine if the displayed symbols form any additional winning symbol combinations, and (E) when the displayed symbols form any additional winning symbol combinations, provide an additional award based on said additional winning symbol combinations, and (iii) when the determination is not to provide the additional win opportunity, terminate the play of the game.

2. The gaming system of claim 1, wherein the plurality of instructions cause the at least one processor to operate with the at least one display device to determine whether to provide the additional win opportunity based on whether an additional win opportunity criterion is satisfied.

3. The gaming system of claim 2, wherein the additional win opportunity criterion is satisfied based on an optional portion of a wager amount provided prior to the play of the game.

4. The gaming system of claim 3, wherein the optional portion of the wager amount is based on a quantity of symbols to be removed based on the at least one removal criterion.

5. The gaming system of claim 2, wherein the additional win opportunity criterion is satisfied based a determination made as a result of the optional wager amount having been provided prior to the play of the game.

6. The gaming system of claim 2, wherein the additional win opportunity criterion is satisfied based, at least in part, on a random eligibility determination made for the play of the game.

7. The gaming system of claim 1, wherein the at least one removal criterion includes whether any displayed symbol is a designated type of symbol.

8. The gaming system of claim 1, wherein, when the determination is to provide the additional win opportunity, the plurality of instructions cause the at least one processor to operate with the at least one display device and the at least one input device to enable a player to select at least one displayed symbol, and wherein the at least one removal criterion includes whether the player has selected any displayed symbol.

9. The gaming system of claim 1, wherein, when the determination is to provide the additional win opportunity, the plurality of instructions cause the at least one processor to operate with the at least one display device and the at least one input device to enable a player to select at least one symbol position, and wherein the at least one removal criterion includes whether any displayed symbol is in the selected symbol position.

10. The gaming system of claim 1, wherein when the determination is to provide the additional win opportunity, the removal is independent of a portion of the play of the game prior to the determination of whether to provide the additional win opportunity.

11. The gaming system of claim 1, wherein determining whether to provide the additional win opportunity includes determining whether a player selected one of a plurality of different packages, each of the plurality of packages resulting in a removal of one or more symbols during the additional win opportunity, and each of the plurality of packages being associated with a price based on an expected outcome of that package.

12. The gaming system of claim 1, wherein when the displayed symbols form any game winning symbol combinations, said removal of at least one symbol from at least one game winning symbol combination from display includes:

(1) causing any symbol which is displayed in the predetermined spatial relationship with any empty symbol position to shift in to that empty symbol position according to the predetermined rule, and (2) after said shifting, generating one or more of the plurality of symbols in each of any then-empty symbol positions.

13. The gaming system of claim 1, wherein the predetermined spatial relationship is satisfied when any symbol is displayed adjacent to and above any empty symbol position, and wherein the predetermined rule includes shifting a displayed symbol downward.

14. A gaming system comprising:

at least one input device;

at least one display device;

at least one processor; and at least one memory device which stores a plurality of instructions, which when executed by the at least one processor, cause the at least one processor to operate with the at least one input device and the at least one display device, following a first portion of a play of a game, after which each of a plurality of symbol positions displays one of a plurality of different symbols, to:

(a) determine whether to provide an additional win opportunity, said determination being independent of the displayed symbols, (b) when the determination is to provide the additional win opportunity:

(i) enable a player to select at least one displayed symbol, (ii) remove at least one symbol from display based on the at least one player-selected symbol, (iii) cause any symbol which is displayed in a predetermined spatial relationship with any empty symbol position to shift in to that empty symbol position according to a predetermined rule, (iv) after said shifting, generate one or more of the plurality of symbols in each of any then-empty symbol positions, (v) determine if the displayed symbols form any additional winning symbol combinations, and (vi) when the displayed symbols form any additional winning symbol combinations (1) provide an additional award based on said additional winning symbol combinations, (2) remove at least one of the plurality of displayed symbols from the plurality of symbol positions, and (3) repeat (iii) to (vi), and (c) when the determination is not to provide the additional win opportunity, terminate the play of the game.

15. The gaming system of claim 14, wherein the plurality of instructions cause the at least one processor to operate with the at least one display device to determine whether to provide the additional win opportunity based on whether an additional win opportunity criterion is satisfied.

16. The gaming system of claim 15, wherein the additional win opportunity criterion is satisfied based on an optional portion of a wager amount provided prior to the play of the game.

17. The gaming system of claim 16, wherein the optional portion of the wager amount is based on a quantity of symbols to be removed based on the at least one removal criterion.

18. The gaming system of claim 15, wherein the additional win opportunity criterion is satisfied based on an optional wager amount provided after determining that the displayed symbols do not form any game winning symbol combinations during the play of the game.

19. The gaming system of claim 15, wherein the additional win opportunity criterion is satisfied based, at least in part, on a random eligibility determination made for the play of the game.

20. The gaming system of claim 14, wherein determining whether to provide the additional win opportunity includes determining whether a player selected one of a plurality of different packages, each of the plurality of packages resulting in a removal of one or more symbols during the additional win opportunity, and each of the plurality of packages being associated with a price based on an expected outcome of that package.

21. The gaming system of claim 14, wherein the additional award includes access to at least one bonus event different from the additional win opportunity.

22. The gaming system of claim 14, wherein the predetermined spatial relationship is satisfied when any symbol is displayed adjacent to and above any empty symbol position, and wherein the predetermined rule includes shifting a displayed symbol downward as far as possible.

23. A method of operating a gaming system, said method comprising, for a play of a game:

(a) causing at least one display device to display a plurality of symbol positions in a designated arrangement of symbol positions, (b) for each of the symbol positions, causing the at least one display device to display a randomly generated one of a plurality of symbols in said symbol position, (c) causing at least one processor to execute a plurality of instructions to determine if the displayed symbols form any game winning symbol combinations, (d) when the determination is that the displayed symbols form any game winning symbol combinations:

(i) causing the at least one display device to display a win indication based on said game winning symbol combinations;

(ii) removing at least one symbol from at least one game winning symbol combination from said display, (iii) causing the at least one display device to display one of the plurality of symbols in each of any then-empty symbol positions, and (iv) repeating (c) and (d), (e) causing the at least one processor to execute the plurality of instructions to determine whether to provide an additional win opportunity, said determination being independent of the displayed symbols, (f) when the determination is to provide the additional win opportunity:

(i) removing at least one symbol from said display based on at least one removal criterion, (ii) causing any symbol which is displayed in a predetermined spatial relationship with any empty symbol position to shift in to that empty symbol position according to a predetermined rule, (iii) after said shifting, causing the at least one processor to execute the plurality of instructions to generate one or more of the plurality of symbols in each of any then-empty symbol positions, (iv) causing the at least one processor to execute the plurality of instructions to determine if the displayed symbols form any additional winning symbol combinations, and (v) when the determination is that the displayed symbols form at least one additional winning symbol combinations, causing the at least one display device to display an additional win indication based on said at least one additional winning symbol combination; and (g) when the determination is not to provide the additional win opportunity, causing the at least one processor to execute the plurality of instructions to terminate the play of the game.

24. The method of claim 23, which includes causing the at least one processor to execute the plurality of instructions to determine whether to provide the additional win opportunity based on whether an additional win opportunity criterion is satisfied.

25. The method of claim 24, wherein the additional win opportunity criterion is satisfied based, at least in part, on a random eligibility determination made for the play of the game.

26. The method of claim 23, wherein the at least one removal criterion includes whether any displayed symbol is a designated type of symbol.

27. The method of claim 23, which includes, when the determination is to provide the additional win opportunity, enabling a player to select at least one displayed symbol, wherein the at least one removal criterion includes whether the player has selected any displayed symbol.

28. The method of claim 23, which includes, when the determination is to provide the additional win opportunity, enabling a player to select at least one symbol position, wherein the at least one removal criterion includes whether any displayed symbol is in the selected symbol position.

29. The method of claim 23, wherein when the determination is to provide the additional win opportunity, any removal during said additional win opportunity is independent of a portion of the play of the game prior to the determination to provide the additional win opportunity.

30. The method of claim 23, wherein when the displayed symbols form any game winning symbol combinations, said removal of at least one symbol from at least one game winning symbol combination from display includes:

(1) causing any symbol which is displayed in the predetermined spatial relationship with any empty symbol position to shift in to that empty symbol position according to the predetermined rule, and (2) after said shifting, causing the at least one processor to execute the plurality of instructions to generate one or more of the plurality of symbols in each of any then-empty symbol positions.

31. The method of claim 23, wherein the predetermined spatial relationship is satisfied when any symbol is displayed adjacent to and above any empty symbol position, and wherein the predetermined rule includes shifting a displayed symbol downward as far as possible.

* * * * *

UNITED STATES PATENT AND TRADEMARK OFFICE

CERTIFICATE OF CORRECTION

PATENT NO. : 8,323,091 B2
APPLICATION NO. : 12/853050
DATED : December 4, 2012
INVENTOR(S) : Gregory F. Frank et al.

It is certified that error appears in the above-identified patent and that said Letters Patent is hereby corrected as shown below:

IN THE CLAIMS

In Claim 1, Column 32, Line 49, replace “in to” with --into--.
In Claim 5, Column 33, Line 10, replace “the” with --an--.
In Claim 12, Column 33, Line 54, replace “in to” with --into--.
In Claim 14, Column 34, Line 20, replace “in to” with --into--.
In Claim 23, Column 35, Line 26, delete “said”.
In Claim 23, Column 35, Line 37, delete “said”.
In Claim 23, Column 35, Line 41, replace “in to” with --into--.
In Claim 23, Column 35, Lines 52 to 53, replace “combinations” with --combination--.

Signed and Sealed this
Twenty-sixth Day of November, 2013

Margaret A. Focarino

Margaret A. Focarino
*Commissioner for Patents of the United States Patent and Trademark Office*